(12) United States Patent
Bauer

(10) Patent No.: US 9,041,769 B2
(45) Date of Patent: May 26, 2015

(54) SYSTEM AND METHOD FOR CONTROLLING MEDIA PROJECTORS

(76) Inventor: Will Bauer, Edmonton (CA)

( * ) Notice: Subject to any disclaimer, the term of this patent is extended or adjusted under 35 U.S.C. 154(b) by 167 days.

(21) Appl. No.: 13/879,431

(22) PCT Filed: Oct. 18, 2011

(86) PCT No.: PCT/CA2011/050658
§ 371 (c)(1),
(2), (4) Date: Apr. 15, 2013

(87) PCT Pub. No.: WO2012/051715
PCT Pub. Date: Apr. 26, 2012

(65) Prior Publication Data
US 2013/0193855 A1    Aug. 1, 2013

Related U.S. Application Data

(60) Provisional application No. 61/393,955, filed on Oct. 18, 2010.

(51) Int. Cl.
*H04N 9/64*      (2006.01)
*H05B 37/02*     (2006.01)
*G01C 11/02*     (2006.01)
*H04N 9/31*      (2006.01)

(52) U.S. Cl.
CPC .............. *H05B 37/02* (2013.01); *G01C 11/02* (2013.01); *H04N 9/3147* (2013.01); *H05B 37/0254* (2013.01); *H05B 37/029* (2013.01)

(58) Field of Classification Search
USPC ............... 348/333.01, 333.06, 333.07, 333.1, 348/E5.138, 14, E4.145, 37–39
See application file for complete search history.

(56) References Cited

U.S. PATENT DOCUMENTS

| 6,310,650 | B1 * | 10/2001 | Johnson et al. | 348/383 |
| 7,525,669 | B1 * | 4/2009 | Abdollahi | 356/603 |
| 2006/0221072 | A1 * | 10/2006 | Se et al. | 345/420 |
| 2008/0055591 | A1 * | 3/2008 | Walton | 356/237.1 |

* cited by examiner

*Primary Examiner* — Minh D A
(74) *Attorney, Agent, or Firm* — Davis & Bujold, P.L.L.C.; Michael J. Bujold

(57) ABSTRACT

A method of controlling media projectors includes providing at least one electromagnetic detector having a field of view directed toward a three dimensional space, and photogrammetrically characterizing at least a portion of the field of view. There is provided at least one media projector that projects at least an electromagnetic signal and a projection controller that moves one or more media projectors in at least two dimensions. At least three measurement locations are obtained within the at least a portion of the field of view by moving the media projector in at least two dimensions. The at least one electromagnetic detector is used to detect the measurement locations within the three dimensional space using the electromagnetic detector to obtain photogrammetric data. The projection controller is calibrated based on the photogrammetric data.

31 Claims, 8 Drawing Sheets

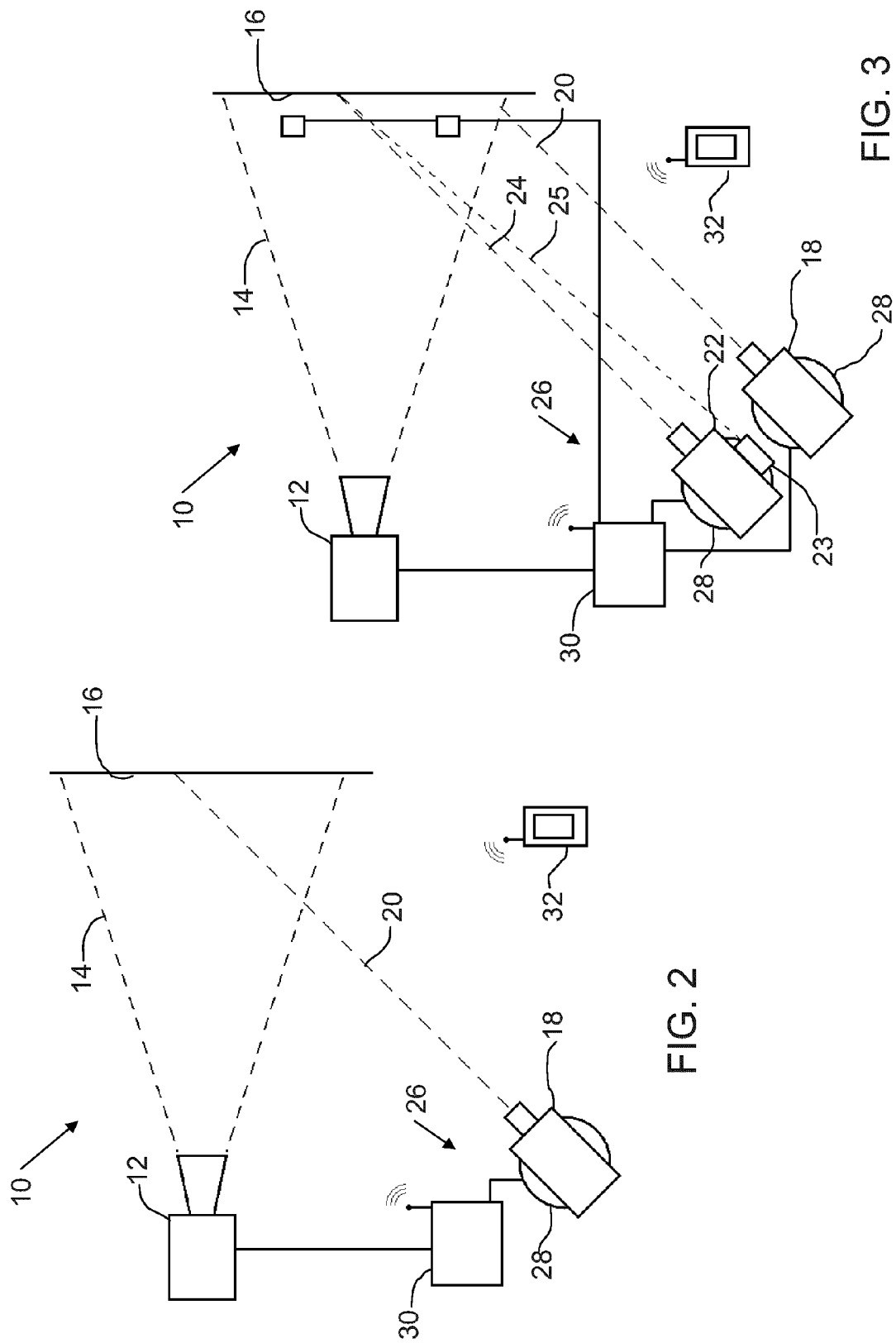

SYSTEM AND METHOD FOR CONTROLLING MEDIA PROJECTORS

FIELD

This relates to methods and apparatuses for automatic three-dimensional position or orientation calibration and control of media projection devices.

BACKGROUND

Media projectors, such as spotlights, other lighting, sound projectors, etc. are used in various circumstances, such as during performances or other multimedia displays. U.S. Pat. No. 5,406,176 (Sugden) entitled "Computer Controlled Stage Lighting System" describes a system for controlling the movement of lamp units that are pre-programmed to act on stored cue data.

SUMMARY

A problem common to the use of various sorts of Media Projection Devices is that their mounting location and orientation relative to where they project is unknown. This is particularly true in the case of touring installations, where differing venue building structures guarantee different mounting configurations (and thus projection geometries), but it can also be problematic in non-touring situations. Some Media Projection Devices can be relatively easily compensated for such differences—for example, video projectors can shift their focus calibration under the control of a setup technician. However, for many such devices, particularly ones involving real-time movement of the projection during an event, it is not possible to compensate for the errors in real-time projection location brought on by different mounting locations/orientations. For example, in events involving robotic entertainment lighting projection, mounting of lights in positions different from those envisaged in the original show design can result in significant differences between the real-time "look" of the lights (where they move on the stage and walls; how their elliptical beam projections are sized, etc.) and the appearance originally conceived by the event's lighting designer.

As discussed herein, this problem may be addressed by providing a way of automatically determining the 3D position and orientation of an arbitrary number of Media Projection Devices in a useful and time-efficient manner such that even a large number of such lights may be 3D-calibrated in a relatively short period of time (time often being of the essence) upon setup at a new installation site. Having been so calibrated, it is possible to control the directional movement of the Media Projection Devices such that they conform to the original desired projection positions created by the event's media designer(s). As well, it is possible to control non-positional elements, or media characteristics, such as focus, iris (beam width) and other useful real-time controls in response to the knowledge of 3D position/orientation for each individual projector such that the media characteristics, or in the case of visual media, the "look" of the overall installation, conforms very closely (if not identically) to that originally envisaged.

Media projection devices as contemplated herein may include robotic lights such as those found in entertainment lighting systems; moveable yokes or mirrors capable of changing the projection direction of lights, video projectors, audio speaker systems, etc., mounted on or within yokes or mirrors; or any other media platforms capable of projecting media through 3D space in a directed fashion where the direction is variable in real-time. As visual light projectors are the most common type, these are generally used in the discussion below. However, it will be understood by those skilled in the art that the concepts discussed below may be generalized to other types of media projection devices.

Using the principles discussed herein, it may also be possible for an operator to indicate positions of interest on one or more two-dimensional real-time camera video image displays of the stage and to directly control real-time 3D positioning of the projections from one or more Media Projection Devices by clicking (and dragging) with a computer mouse, touching a computing platform's "touch screen" interface with an appropriate stylus or finger, touching a 2D drawing pad interface also connected to the system's computer, or from some other appropriate interface or input device(s) mapped to superimpose its measurements onto the real-time camera image. This may be done to control one Media Projection Device, or many Media Projection Devices simultaneously. In addition, the interface or input device may allow the operator to select or deselect which Media Projection Devices are to respond to a particular command. This allows many Media Projection Devices to be controlled in a flexible, customized manner and may have application in both pre-event media setup and configuration activities and during actual events when it can be used to coordinate media effects such as, for example, real-time performer-centric or moveable-prop-centric cueing quickly and deftly. For example, it allows the media to be directed at performer positions, to follow performers as the move on stage, to change the "look" of Media Projection Devices (colour, pattern, size, etc.) in response to where on the stage an object of interest such as a performer or moving prop is located, etc.

The system and method described below utilizes the mathematics of two-dimensional and three-dimensional geometry combined with computer vision projection sensing and real-time computing and control algorithms. It creates a system capable of examining both the shape of static projections and the trajectory of moving projections—both of which contain important information about the three-dimensional location and orientation of the projection source(s)—to establish the three-dimensional position and orientation of one or more Media Projection Devices relative to an inertial frame of reference. This frame of reference is determined (by photogrammetric analysis) from one or more electronic imaging camera(s), whose own position/orientation relative to the inertial reference frame is established as part of the setup. Once established, this three-dimensional calibration is capable of being used to control one or more Media Projection Devices in novel ways so as to be able to modify the real-time physical positioning, movement, and appearance of the media projections coming from these devices.

The method and apparatus discussed herein includes a properly integrated combination of the following principles:
  a) "Photogrammetric Measurement" whereby measurements of three-dimensional ("3D") distances at known, assumed, or implied heights between disparate pixels or groups of pixels of interest in a two-dimensional digital video image may be obtained from a properly set up and calibrated electronic imaging system consisting of one or more video sources.
  b) "Projection Media Pose Determination" whereby the three-dimensional ("3D") position and orientation (X,Y,Z Cartesian coordinates position plus Pan, Tilt, and Rotation angular orientation—or equivalent alternate convenient 3D mathematical descriptions thereof) "Pose" of one or more "Media Projection Device(s)"

("MPDs") is established. Such Media Projection Device(s) are capable of directed media projection into a 3D space, such projection being directed along a time-varying, three-dimensional "Pointing Line", such a Pointing Line's direction in three-dimensions being electronically controllable by a "Pointing Control Element"—electronically controllable motors or other apparatus internal or external to the media projection device. It is understood that the term "Pointing Line" in this context does not have to be strictly linear but rather may be any mathematically describable path that can be construed to have a direction; the term "Line" is used solely for convenience since it is often the case that media projection directions are truly linear, or a close approximation thereof.

c) "Calibration Algorithms" whereby the internal calibration of such Pointing Control Element is determined such that it is possible to convert back and forth between the internal settings of the Pointing Control Element and angular offsets relative to the Media Projection Device's mathematically described Pose, such conversions effectively conferring the ability to specify the direction of the Pointing Line (along which the Media Projection Devices are projecting) and control this direction in real-time. These calibrations are preferably specific to each MPD and can be redone as motors and components age to ensure continued accuracy.

d) "Controller" whereby the calibration derived by the Calibration Algorithms above may be employed to point one or more Media Projection Devices in real-time such that their direction of media projection is along a time-variable Pointing Line that intersects a three-dimensional point of interest. The Controller may be further employed to modify MPD parameter settings in real-time in order to make the projection(s) conform to previously designed constraints regarding location or appearance. Such constraints could involve restrictions on their respective projection surface locations or modifications related to the media characteristic, such as "look" parameters in the case of visual media, which may include projection size (iris, beam width, or "barn-door" settings, etc.) and shape (keystone correction, gobo, etc.). Such constraints could also consist of time-varying or static maps of the physical 3D space that associate particular projection "looks" such as size, pattern, colour, shape with specific spatial/temporal regions so that as the projections are directed at different 3D or 2D regions, different "looks" are asserted based on where in space and time (relative to various event timing marks) the MPD is directing its media.

Accordingly, there is provided a method of controlling media projectors, comprising the steps of: providing at least one electromagnetic detector having a field of view directed toward a three dimensional space; photogrammetrically characterizing at least a portion of the field of view; providing at least one media projector that projects at least an electromagnetic signal; providing a projection controller that moves one or more media projectors in at least two dimensions; obtaining at least three measurement locations within the at least a portion of the field of view by moving the media projector in at least two dimensions; using the at least one electromagnetic detector to detect the measurement locations within the three dimensional space using the electromagnetic detector to obtain photogrammetric data; and calibrating the projection controller based on the photogrammetric data to project the media toward an arbitrary point in the three dimensional space.

According to another aspect, the electromagnetic detectors may be video imaging devices.

According to another aspect, the media projector may comprise at least: a visual light projector, a non-electromagnetic projector, a removable electromagnetic projector, or combination thereof.

According to another aspect, there may be one or more pairs of electromagnetic detectors, each pair obtaining a stereoscopic image of the at least a portion of the field of view. There may be a plurality of electromagnetic detectors having overlapping fields of view within the three dimensional space, and the method may further comprising the step of photogrammetrically characterizing the overlapping fields of view.

According to another aspect, the method may further comprise the steps of repositioning at least one media projector, and recalibrating the projection controller to account for the new position.

According to another aspect, the method may further comprise the steps of using a computer interface to specify a selected location or selected path within the three dimensional space; and causing the calibrated projection controller to point at least one media projector at the selected location or along the selected path.

According to another aspect, the projection controller may control the media parameters of the media projector.

According to another aspect, the method may further comprise the step of defining within the projection controller at least one of a spatial media map and a time media map of the at least a portion of the field of view, the projection controller controlling the media parameters of the media projector based on the spatial media map and the time media map.

According to another aspect, the method may further comprise the steps of programming the projection controller with a virtual simulation, the projection controller causing the at least one media projector to project the virtual simulation in the three dimensional space.

According to another aspect, the method may further comprise the step of using at least one of the electromagnetic detector and one or more sensors to detect an event in the three dimensional space. The event may comprise movement of an object or the state of an object, and the method may further comprise the step of modifying the virtual simulation in response to the event.

According to another aspect, each projection controller may be calibrated for each media projector.

According to an aspect, there is provided a system for projecting media, comprising at least one electromagnetic detector having a field of view directed toward a three dimensional space; at least one media projector that projects at least an electromagnetic signal; and a projection controller comprising a motorized controller that moves one or more media projectors in at least two dimensions. The projection controller further comprises a processor that is programmed to: photogrammetrically characterize at least a portion of the field of view; move the at least one media projector in at least two dimensions to obtain at least three measurement locations within the at least a portion of the field of view; detect the measurement locations within the three dimensional space using the at least one electromagnetic detector to obtain photogrammetric data; and calibrate the motorized controller based on the photogrammetric data to project the media toward an arbitrary point in the three dimensional space.

According to another aspect, the at least one electromagnetic detector may comprise at least one video imaging device.

According to another aspect, each media projector may comprise at least: a visual light projector, a non-electromagnetic projector, a removable electromagnetic projector, or combination thereof.

According to an aspect, the system may further comprise one or more pairs of electromagnetic detectors, each pair obtaining a stereoscopic image of the at least a portion of the field of view.

According to another aspect, the system may further comprise a plurality of electromagnetic detectors having overlapping fields of view within the three dimensional space, and further comprising the step of photogrammetrically characterizing the overlapping fields of view.

According to another aspect, the processor may be further programmed to recalibrate the projection controller to account for a new media projector position.

According to another aspect, the processor may be further programmed to instruct the motorized controller to point at least one media projector at a selected location or along a selected path.

According to another aspect, the processor may control the media parameters of the media projector.

According to another aspect, the processor may be programmed with at least one of a spatial media map and a time media map of the at least a portion of the field of view, and the processor may control the media parameters of the media projector based on the spatial media map and the time media map.

According to another aspect, the processor may be programmed with a virtual simulation, and the processor may further be programmed to cause the at least one media projector to project the virtual simulation in the three dimensional space.

According to another aspect, the processor is further programmed to detect an event in the three dimensional space using at least one of the electromagnetic detector and one or more sensors. The event may comprise movement of an object or the state of an object, and the processor may be further programmed to modify the virtual simulation in response to the event.

These and other aspects will be apparent from the specification, drawings and claims contained herein.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 2 is a schematic of a system for projecting media.

FIG. 3 is a schematic of an alternative system for projecting media.

DETAILED DESCRIPTION

Figure 1:
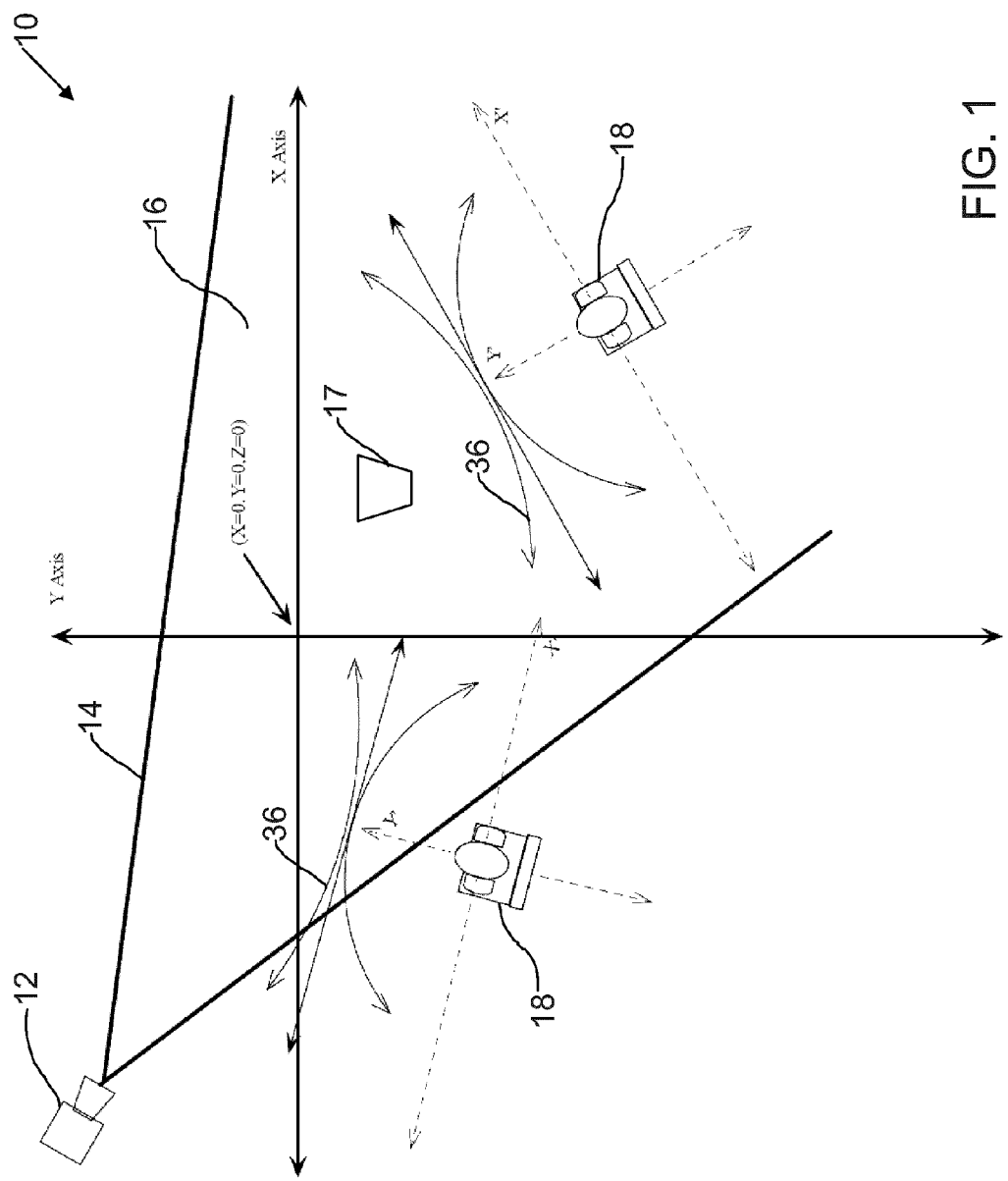
FIG. 1 is a schematic of a system for projecting media depicting the movement of the media projectors.

There is provided a system for calibrating the movement of media projection devices with the intention of controlling their movement. This system may be arranged in various ways. Referring to FIG. 2, the depicted system, generally indicated by reference numeral 10, includes an electromagnetic detector 12 having a field of view 14 directed toward a three dimensional space 16, and a media projector 18 that projects an electromagnetic signal 20. Referring to FIG. 3, two media projectors 18 and 22 are shown, where the media projector 22 projects a non-electromagnetic signal 24 in addition to the electromagnetic signal 20. The electromagnetic signal 20 may be secondary. For example, the non-electromagnetic signal 24 may project sound as the primary media, and an ancillary projector 23 projects an ancillary electromagnetic signal 25, such as for calibration purposes, which may be removed or turned off otherwise. While the electromagnetic signal 25 may be in the visual spectrum in some embodiments, in others it may not. For example, it could be an infrared signal and electromagnetic detector 12 may be an infrared detector. This would allow the operator to know where the sound (or other non-electromagnetic media) is being projected without detracting from the media presentation. Referring again to FIGS. 2 and 3, there is also a projection controller, generally indicated by reference numeral 26 that controls the media projectors 18, or media projectors 18 and 22. The projection controller 26 is used to describe the equipment and control systems between the operator and the media projectors, and may take various forms. As depicted, the projection controller 26 comprises a motorized controller 28 that rotates and tilts each media projector and a processor 30. It will be understood that the media projectors 18/22 may be controlled using various types of motorized controls 28, and may include moving the media projector itself or a mirror associated with the media projector. In addition to redirecting the media projector 18/22, the motorized controls may change the location of the media projector 18/22, such as along a support beam or cable. In some examples, there may be more than one media projector 18/22 that is controlled by a single motorized controller (i.e. two or more projectors on a single platform), or multiple motorized controllers 28 that control a single media projector 18 or 22 or group of media projectors 18/22. In addition to the motorized controls 28, the projection controller includes the processor 30 that is programmed to photogrammetrically characterize some or all of the field of view 14, calibrate the motorized controller 28, and instruct the motorized controller 28 to move the media projector 18/22 based on the calibrations, such that the operator may more effectively direct the media projector 18/22 to a desired location within the field of view 14. The processor 30 and its functions may be divided between different devices, depending on the preferences of the operator or designer and the available resources. For example, rather than having all functions in one processor, there may be a processor 30 attached to the motorized control, and another processor, for example a processor in a mobile device 32 shown in FIG. 3, that used by the operator to perform one or more functions or portions of functions. The various components may communicate wirelessly or by wired connections. In FIG. 3, the mobile device 32 communicates with the processor wirelessly, while the processor 30 communicates via a wired connection with the motorized controllers 28. Other arrangements will be recognized by those skilled in the art. In addition, there may be separate processors 30 (not shown) for each media projector 18/22 or group of projectors, or a single processor 30 that controls all media projectors 18/22. Those skilled in the art of network design and control systems will recognize other combinations or alternatives in designing the projection controller and designs may be used. For simplicity, the discussion below will discuss an embodiment where the processor 30 is part of the operator's control station and all functions are centralized with that processor, with the understanding that the actual implementation may be done according to the alternatives discussed above.

Figure 4:
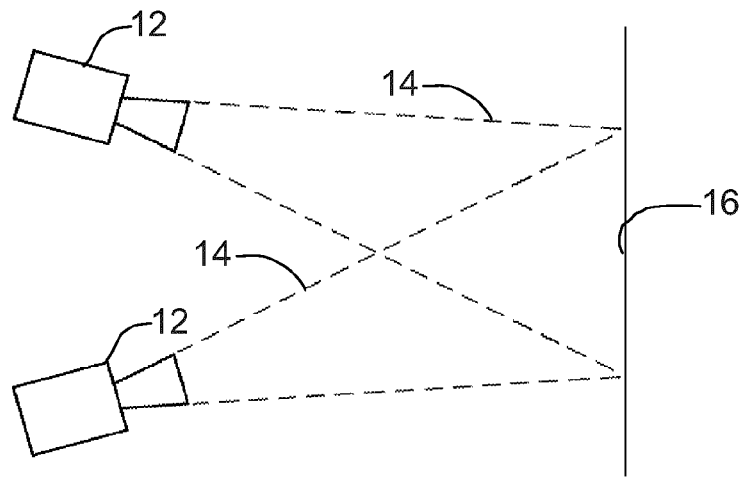
FIG. 4 is an example of a pair of electromagnetic detectors to obtain a stereoscopic image of a field of view.
Figure 5:
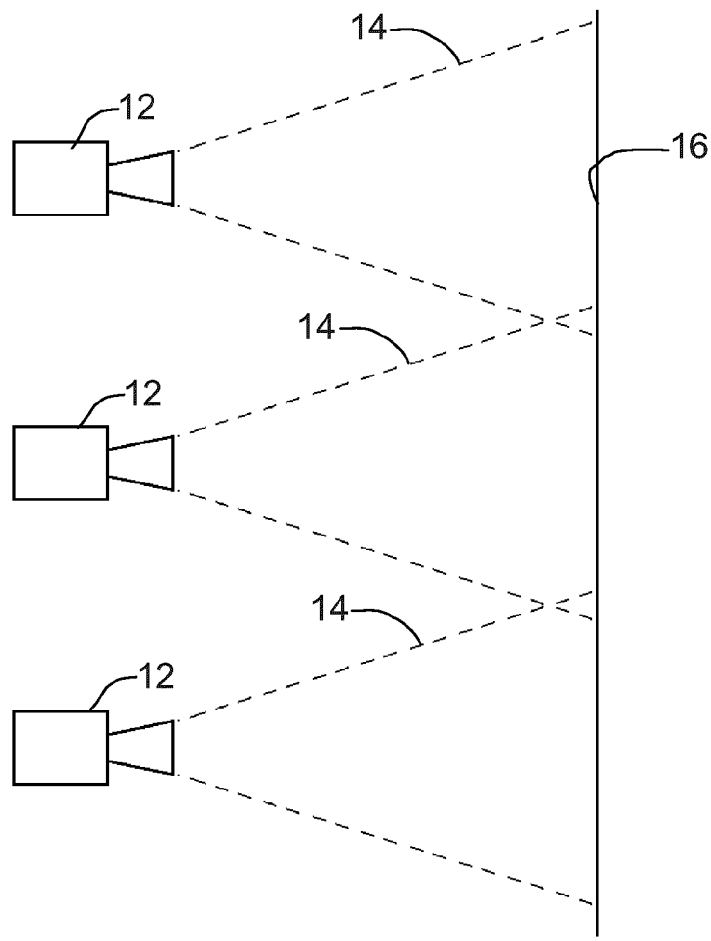
FIG. 5 is an example of a series of electromagnetic detectors with overlapping fields of view.

A brief description of some of the underlying principles used to control media projectors will now be given, based on the system shown in FIG. 1. The electromagnetic detector 12 has a field of view 14 that incorporates a three dimensional space 16, such as a performance stage, or other space into which media will be projected. The system 10 may use some or all of the field of view of the detector, however, for simplicity, the portion that is used will be referred to herein as the field of view. Referring to FIGS. 4 and 5, there may be more than one electromagnetic detectors 12 that may cover the same field of view 14, i.e. to provide a stereoscopic view as shown in FIG. 4, or that may have overlapping fields of view to cover a larger area as shown in FIG. 5. The field of view is photogrammetrically characterized by the processor 30 (shown in FIGS. 2 and 3). Photogrammetric characterization is well known in the art, but generally speaking, photogrammetric characterization involves calculating or estimating depth and relative distances in a three dimensional space based on a two-dimensional input, such as the input received by the electromagnetic detectors 12. In a preferred embodiment, the photogrammetric characterization may be performed by placing one or more characterized objects in the three dimensional space, and, based on the known dimensions of the objects compared to the dimensions measured by the electromagnetic detector, the space may be characterized. Additional details will be discussed in the context of an example below.

Figure 11:
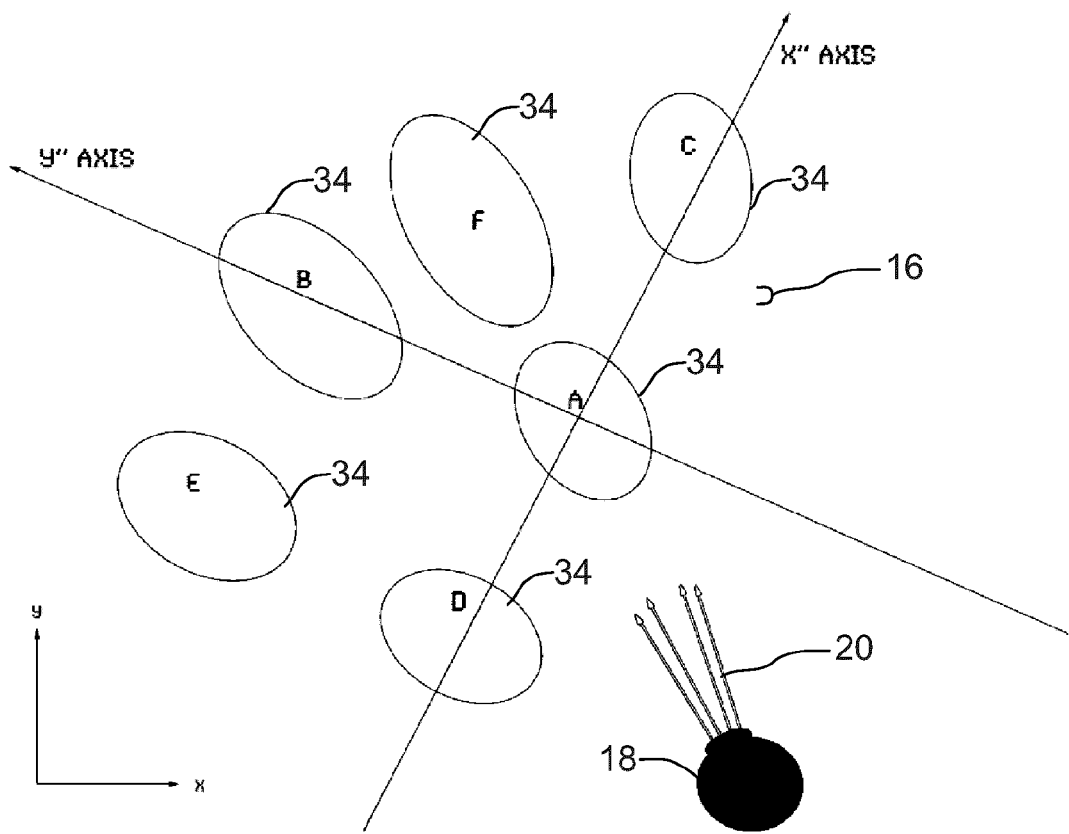
FIG. 11 is a diagram depicting an example of calibration locations.

Once photogrammetrically characterized, the movement of the media projectors 18 to project media within the space must be calibrated. This is done by projecting on three or more measurement or calibration locations 34, as shown in FIG. 11. In the example depicted in FIG. 11, six locations 34, labelled A through F, are used in order to determine the relationship between the movement of the media projector 18 and the resulting position of the projected media in the space, as observed by the electromagnetic detector 12. The known movement of the media projector 18 is compared to the measured location of the projected media in order to calibrate the motorized controls such that a specific location in the space, or path through the space, may be selected by the operator or specified by a program, and the media projector 18 will accurately project the media accordingly. Additional details regarding the calibration process will be discussed below.

In a preferred example, the system may automatically analyze the field of view photogrammetrically and calibrate the movement of the MPDs. In this example, once the equipment has been set up and arranged, the operator would instruct the processor to photogrammetrically characterize all of, or the relevant portion of, the electromagnetic detector's field of view. This may require placing one or more specific objects in the field of view as will be recognized by those skilled in the art, and the operator may be prompted to take the necessary steps. Once photogrammetrically characterized, the processor would then begin to calibrate the movement of the MPDs by measuring a first position, then obtaining additional measurements until a sufficient number of samples has been obtained.

There will now be given a more detailed discussion of specific aspects of the system and method in the context of a system with visual media projectors and components that would most commonly be used in such a system.

Photogrammetric Measurement

Photogrammetric measurements are used that are made from one or more video imaging camera systems connected to a personal computing platform or mobile device of sufficient computational horsepower. Exemplary of such a camera is the "Dragonfly" Firewire digital video imaging camera made by Point Grey Research Inc.; exemplary of a suitable personal computing platform is a standard 3.0 GHz processor speed personal computer running the Windows operating system. However, it is understood that other digital imaging systems, image transfer protocols (USB 2.0, Firewire, Firewire 800, Gigabit Ethernet, etc.), and/or computing platforms may be used, the sole requirement being that the overall system is able to acquire and process images in real-time (for example, preferably 7.5 fps or faster) with enough resolution (for example, preferably 640×480 pixels or higher) so as to be able to properly measure photogrammetric points of interest with enough precision and thus direct the MPD's movements in real-time.

FIG. 1 shows a video imaging camera 12, whose field of view 14 covers an acceptably large volume of 3D space 16 within which one or more Media Projection Devices 18 may "throw" (project) their media if pointed appropriately. Other computer vision research has yielded a number of methods of calibrating the three-dimensional "Pose" (i.e. position and orientation) of cameras relative to a fixed three-dimensional coordinate system within their field of view. This type of coordinate system is typically established based on the placement and orientation of a "Calibration Object" 17 within view of the camera 12. Exemplary of this is a method based on analyzing differences between images of a Calibration Object of known size/shape/pattern (sometimes a specific geometric image printed on a flat surface such as a piece of plastic, paper, or fabric of known and proper size but also sometimes a 3D object of known geometry and size) containing certain specific geometric features. In this technique, knowledge of the appearance of the Calibration Object at a known orientation and distance is compared to what is seen in the camera's field of view. When combined with a priori calibration and knowledge of the camera lens and digital imaging chip geometry, the geometric distortion of the current camera image relative to the known appearance contains enough information to mathematically ascertain the camera's three-dimensional position and orientation Pose relative to a frame of reference established by the location and orientation of the Calibration Object. Through this calibration/setup process, it is possible to determine camera Pose relative to where the Calibration Object is placed and oriented within the camera's field of view. Such a process is straightforward to one skilled in the art and an incidental, although necessary, part of the present system's initial setup.

Once the initial camera Pose has been determined, the camera may be used to make photogrammetric 3D measurements between pixels or groups of pixels of interest found within the camera's current image(s). Images may first be processed to remove the distorting effect of lens curvature and other optical lens aberrations, effectively changing the image so as to appear as if taken with a "perfect" non-distorting lens. Next, in order to automatically detect or highlight potential regions of interest, various sorts of digital image processing algorithms may be employed. Exemplary of these are thresholding, edge detection, spatial frequency filters, and convolution filters; however, as will be recognized by those skilled in the art, many other useful image processing techniques exist that can aid with such measurements, the general reduction of image "noise" levels, and thus improvements to its precision. Such processing is known to those skilled in the art and helps improve the robustness of the present system and method.

Once properly processed to remove lens distortion effects and image noise, 3D projective geometry calculations may be made to measure distances between pixels or groups of pixels of interest. Such projective calculations are also known to those skilled in the art and help the system functioning more effectively. This ability—to take a two-dimensional image and make measurements of three-dimensional spatial distance—relies on implicit assumptions about the height of pixels of interest relative to the plane of the coordinate system's frame of reference. In most practical cases it is sufficient to assume that the planar frame of reference is that of a flat floor, wall, or other planar object and that projections are being made onto that plane at an effective height of zero. In some cases, it may be necessary to introduce one or more additional cameras, all initially calibrated as detailed above, with known 3D separations and 3D geometric relationships with respect to the first camera. In such a way, more accurate 3D measurements of pixels or groups of pixels of interest may be made by comparing two or more simultaneously acquired images of the same scene, each taken from different 3D positions/orientations.

The above techniques permit arbitrary measurements of three-dimensional distance between points of interest to be made in one or more two-dimensional camera images, which may be referred to herein as "Photogrammetric Measurements".

Projection Media Pose Determination

The process of setting up and configuring the ability to perform photogrammetric measurements described above provides a calibrated, three-dimensional reference system that may serve as a frame of reference for mathematical calculations. Exemplary of this is a three dimensional, Cartesian, three-axis reference system, having one axis oriented in each of three orthogonal directions: "X", "Y", and "Z" and a zero-valued origin (having 3-Space coordinates ($X=0, Y=0, Z=0$)) at their intersection. Such a system, while not the only mathematical coordinate reference system possible to use, is used for reference herein to describe the Projection Media Pose determination approach discussed below. Those skilled in the art will recognized that other coordinate systems, such as spherical or cylindrical coordinates. While the discussion below relates to Cartesian coordinates, those skilled in the art will understand how the principles apply to other suitable coordinate systems.

Determination of the Pose of a Media Projection Device ("MPD") is performed in two steps: Firstly, the 3D X,Y,Z coordinates of its location are found; secondly, its angular orientation in 3D is determined. Determination of the Pose of multiple MPDs is achieved by repeating the process of single MPD Pose determination for each MPD for which calibration is desired. The method of X,Y,Z coordinate determination in this example uses knowledge of the 3D geometric relationships between focused, three-dimensionally-shaped, beams of light from the MPD intersecting with a surface of known 3D geometry. The three-dimensional shape of such light beams must be such that intersection with the surface of known 3D geometry provides shapes whose form contains information regarding the 3D position and orientation of the light beam's origin. For simplicity, intersection of a 3D conical beam of light with a 3-Space plane (whose equation is of the general form: $aX+bY+cZ+d=0$, a,b,c, and d being constant coefficients and X,Y,Z being independent variables) is discussed in this document. Thus the "intersection" mentioned above is really projection of a cone of light onto a planar surface such as a floor or wall, such projection/intersection creating a generally elliptically shaped light pattern that mathematically relates to the equations of a conic section. However, it is understood that similar results could be obtained by examining other mathematical patterns of interest arising from intersection of other, non-conical, three-dimensionally shaped light beams with a projection surface that was non-planar yet still able to be mathematically described.

As can be seen, the present example uses mathematics combined with computer-vision image analysis of a series of static MPD projection positions (at properly chosen locations) combined with knowledge of the geometric specifics of the MPD motion control platform to enable calculation of the MPD's 3D position/orientation in mathematical 3-Space and control of the MPD based on that knowledge.

As the MPD's direction of projection is changed, the movement of its projected light patterns also yields information about the position and orientation of the MPD relative to the projection surface. How this information is encoded into the changing projection patterns is dependent on the nature of the MPD motion control. One commonly used method involves control of the projection direction of each MPD via motors which control rotational movement about two orthogonal axes dubbed "pan" and "tilt". The geometry of these axes is normally one wherein rotatable tilt motors are mounted on top of an orthogonal, rotatable, pan platen and are thus also rotated when changes in pan angle occur. In such an exemplary situation, movement of the projection of an MPD on a planar surface such as a stage floor is such that the successive projection positions themselves describe arcs on the floor mathematically equivalent to conic section equations and planar intersections. This is due to the fact that an MPD that is tilted at any angle except parallel to its plane of pan rotation will describe a conical shape in space as it is rotated in its pan plane. Referring to FIG. 1, when the MPD 18 is tilted exactly parallel to its pan plane, it describes a planar shape when rotated, thus giving rise to a linear arc (the intersection of two planes) of motion for its projection onto the stage floor. FIG. 1 shows examples of two such exemplary MPD devices and indicates the nature of the MPD projection arcs, represented by arrows 36, that would be inscribed on the planar stage floor as the MPD 18 was panned at tilt angles above, parallel to, and below the plane of its pan rotation. Such shapes are representative of the type of geometric information encoding that occurs. In this example, the three dimensional space is described by the XYZ coordinate system and represents the absolute inertial coordinate system, relative to which all three-dimensional MPD 18 and electronic imaging camera 12 position and orientations are calculated. The X'Y'Z' coordinate system is a self-referential coordinate system maintained by each MPD itself. The orientation of this coordinate system relative to the XYZ coordinate system changes depending on the MPD's orientation since the X'Y'Z system is "attached" to the MPD 18 and moves as its orientation changes. The "pan plane" is the two-dimensional splan in 3-Space that is perpendicular to one axis of externally controllable angular MPD movement. This plane changes with the static orientation of the MPD 18 in 3-Space but does not change when the MPD's real-time direction of media projection is changed. It can thus be thought of as defining the MPD's orientation in 3-Space in conjunction with knowledge of a "zero" point for pan axis rotation.

As can be seen, the present system uses mathematics combined with computer-vision images of the movement of MPD projections and with knowledge of the geometric specifics of the MPD motion control platform to enable calculation of the MPD's 3D position/orientation in mathematical 3-Space and control of the MPD based on that knowledge.

It is understood that motion control of MPDs, other than the aforementioned pan/tilt motors would give rise to other, somewhat different mathematical approaches other than the pan/tilt example mentioned above. The mathematics of these would be evident to one skilled in the art of such matters once the basic principles described above are appreciated in the overall context of the present discussion.

In the case of MPDs that do not inherently project light, it is clear one or more separate lighting device(s) capable of such focused, three-dimensionally shaped, light projection would need to be attached to the MPD and aligned to its direction/path of projection so as to be in some calculable orientation relative to the direction of projection of the MPD media, such as ancillary projector 23 shown in FIG. 3. Such ancillary calibration lighting would then be controlled using computer control methods similar to those discussed below in order to make measurements of the calibration light Pose and use such as a proxy for the MPD itself. Such attachment and control is within the normal purview of one skilled in the art and will not be further elaborated here.

An exemplary calculation of three-dimensional X,Y,Z location is provided below, with the understanding that other, similar, calculations for different three-dimensionally shaped beams of light and planar or non-planar 3D surfaces are possible. It proceeds by first calculating X and Y coordinates, then using these to calculate the final Z coordinate value.

Calculation of MPD X and Y Position Coordinates:

Using the coordinates of two ellipses projected by the MPD, a pair of linear equations can be derived. These specify lines collinear with the major axes of the two ellipses of FIG. 6.

1. $Py = \left(\frac{f-b}{e-a}\right) * Px + \left(d - \left(\frac{f-b}{e-a}\right) * c\right)$ $Y = M * X + B$ 2. $Py = \left(\frac{h-l}{g-k}\right) * Px + \left(j - \left(\frac{h-l}{g-k}\right) * i\right)$ From these equations, an equation for Px can be derived, with the restrictions that g≠k and e≠a.

3. $Px = -\left(\frac{B1 - B2}{M1 - M2}\right)$

To determine the value for Py, the value for Px is substituted into equation 1 or 2. And so, the (x,y) position of the spotlight is known. This information is used to calculate Ma, Mb, L and Q (see the Z coordinate calculation below).

Figure 6:
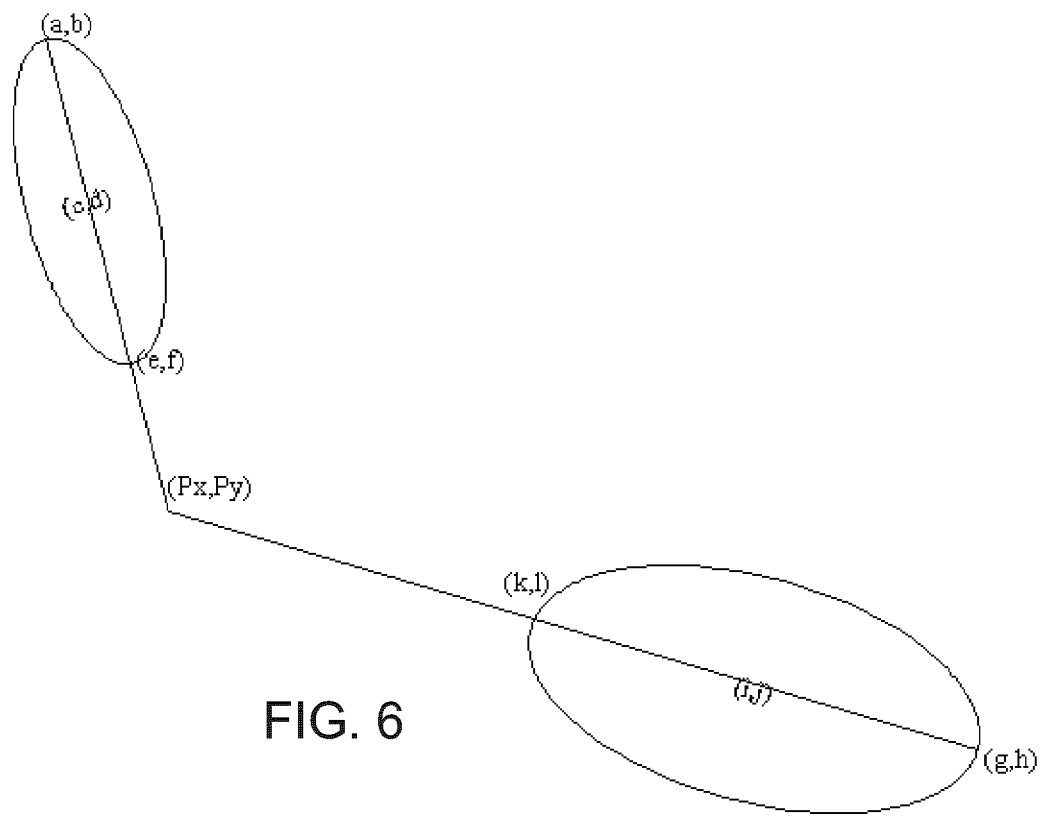
FIG. 6 is a diagram depicting a sample calculation of X and Y coordinates for a media projector.
Figure 7:
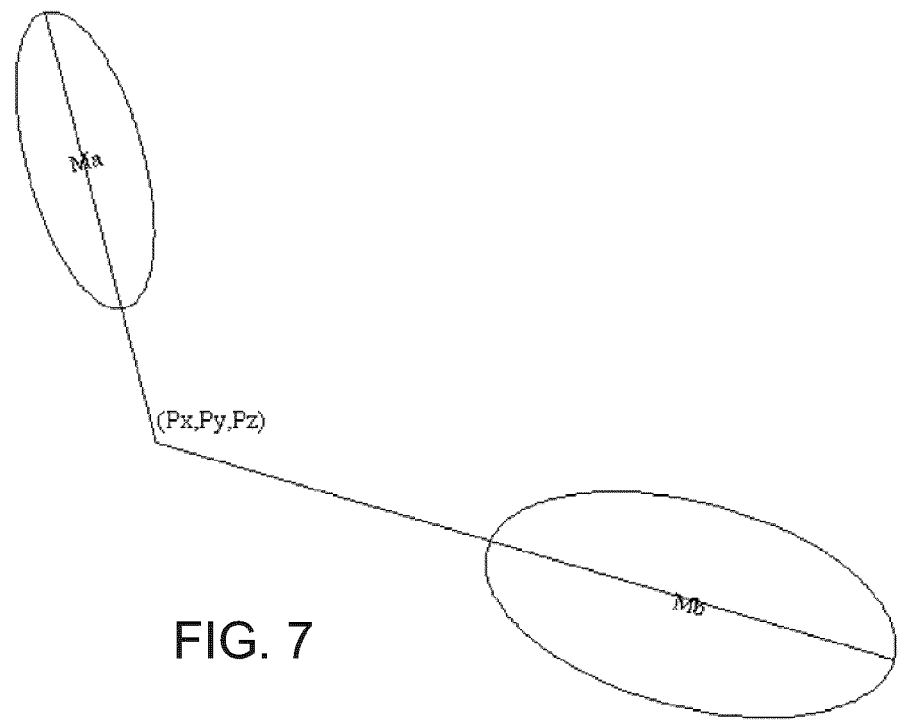
FIG. 7 is a diagram depicting a sample calculation of X, Y and Z coordinates for a media projector.
Figure 8:
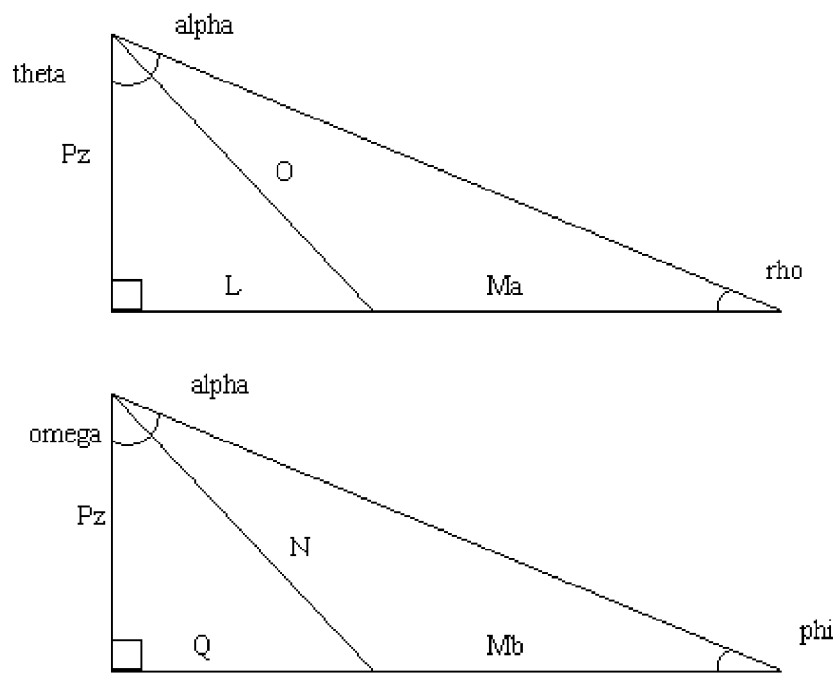
FIG. 8 is a diagram depicting a sample calculation of the Z coordinate of a media projector.

Calculation of MPD Z Position Coordinate:

FIGS. 7 and 8 are representations of geometric situation deriving from FIGS. 1 and 6 but include information about the angular orientation due to the MPD Z coordinate.

Using two different ellipse positions and the intersection of their extended major axes, the value of Pz (see FIG. 8) can be determined as well as O, N, alpha, theta, phi, rho, and omega. And so, the 3D position of P (the spotlight) is known. The following equations are derived from the coordinates illustrated in FIG. 6.

1. $Ma = \sqrt{(a-e)^2 + (b-f)^2}$

2. $Mb = \sqrt{(g-k)^2 + (h-l)^2}$

3. $L = \sqrt{(e-Px)^2 + (f-Py)^2}$

4. $Q = \sqrt{(k-Px)^2 + (l-Py)^2}$

All the negative values are disregarded because the information from the coordinates gives us enough information on the locations of the ellipses and the spotlight. In addition, the value for alpha is constrained by the following equations.

5. $\alpha + \theta + \rho = 90°$

6. $\alpha + \omega + \phi = 90°$

7. $\theta = \arctan\left(\frac{L}{\sqrt{-\frac{L^2 Mb + MaLMb - MaQ^2 - MaMbQ}{Mb - Ma}}}\right)$ 8. $\omega = \arctan\left(\frac{Q}{\sqrt{-\frac{L^2 Mb + MaLMb - MaQ^2 - MaMbQ}{Mb - Ma}}}\right)$ 9. $O = Ma * \dfrac{\left(\sqrt{-\dfrac{-MaLMb + MaQ^2 + MaMbQ - L^2 Mb}{L^2 Ma - MaLMb - MaQ^2 + 2Ma^2 L - MaMbQ + Ma^3}}\right)}{\left(\sqrt{-\dfrac{-MaMb^2 Q + MaLMb^2 - Ma^2 LMb + Ma^2 Q^2 + L^2 Mb^2 + Ma^2 MbQ - MqQ^2 Mb - L^2 MbMa}{L^4 + Q^4 + L^2 Mb^2 + Mb^2 Q^2 + 2Q^3 Mb + L^2 MbMa - 2L^2 MbQ + MaQ^2 Mb + 2L^3 Ma - 2MaLMb - 2MaLQ^2 - Ma^2 MbQ + MaMb^2 Q - Ma^2 Q^2 + Ma^2 LMb - MaLMb^2 + Ma^2 L^2 - 2L^2 Q^2}}\right)}$ -continued 10. $N = Mb * \dfrac{\left(\sqrt{-\dfrac{-MaLMb + MaQ^2 + MaMbQ - L^2Mb}{L^2Ma - MaLMb - MaQ^2 + 2Ma^2L - MaMbQ + Ma^3}}\right)}{\left(\sqrt{-\dfrac{-MaMb^2Q + MaLMb^2 - Ma^2LMb + Ma^2Q^2 + L^2Mb^2 + Ma^2MbQ - MaQ^2Mb - L^2MbMa}{L^4 + Q^4 + L^2Mb^2 + Mb^2Q^2 + 2Q^3Mb + L^2MbMa - 2L^2MbQ + MaQ^2Mb + 2L^3Ma - 2MaLMbQ - 2MaLQ^2 - Ma^2MbQ + MaMb^2Q - Ma^2Q^2 + Ma^2LMb - MaLMb^2 + Ma^2L^2 - 2L^2Q^2}}\right)}$ 11. $Pz = \sqrt{-\dfrac{L^2Mb + MaLMb - MaQ^2 - MaMbQ}{Mb - Ma}}$ 12. $\phi = \arcsin\left(\sqrt{-\dfrac{-MaLMb + MaQ^2 + MaMbQ - L^2Mb}{L^2Mb + MaLMb - Mb^3 - 2Mb^2Q + MaMb^2 - MbQ^2 + MaMbQ}}\right)$ 13. $\rho = \arcsin\left(\sqrt{-\dfrac{-MaLMb + MaQ^2 + MaMbQ - L^2Mb}{L^2Ma - MaLMb + Ma^3 + 2Ma^2L + Ma^2Mb - MaQ^2 - MaMbQ}}\right)$ 14. $\alpha = \sqrt{-\dfrac{-L^2MbMa + L^2Mb^2 - Ma^2LMb + MaLMb^2 + Ma^2MbQ - MaMb^2Q + Ma^2Q^2 - MaQ^2Mb}{-2L^2Q^2 - 2L^2MbQ + L^2MbMa + 2L^3Ma + MaQ^2Mb - Ma^2Q^2 + MaMb^2Q + L^4 + Q^4 + 2Q^3Mb + Mb^2Q^2 - Ma^2MbQ - MaLMb^2 + Ma^2LMb + Ma^2L^2 - 2MaLQ^2 - 2MaLMbQ - L^2Mb^2}}$ Example Calculation of MPD Three-Dimensional Orientation:

The example may be stated as follows: Given MPD three-dimensional position coordinates XL,YL,ZL, find the MPD's orientation such that it is then possible to point the MPD at an arbitrary 3D point within 3-Space. To begin, the "plane of orientation" of the light is found, i.e. the plane that is co-planar with the light's pan rotation (and therefore tangential to its tilt rotation plane). From published 3-Space mathematical theorems, the following equation describes an arbitrary plane in 3-Space:

$ax+by+cz+d=0$ (1)

The MPD is pointed at two well-spaced points on the floor, each point having a common pan angle but different tilt angles (i.e. at a chosen pan angle, tilt the light at two separate tilt angles so that it points at two separate points). These two points plus the MPD's own XL,YL,ZL centre will form a plane tangent to the MPD's plane of orientation. Set these three points as (x1,y1,z1), (x2,y2,z2), and (x3,y3,z3). Then solve the equation of this plane by plugging these three points into equation (1) above and setting "d" (a scaling variable) arbitrarily to equal 1. The result, solving for a, b, c, and leaving scaling variable "d" as a variable is:

$a=-(d(-y2z1+y3z1+y1z2-y3z2-y1z3+y2z3))/(-x3y2z1+x2y3z1+x3y1z2-x1y3z2-x2y1z3+x1y2z3)$ (2)

$b=-(d(x2z1-x3z1-x1z2+x3z2+x1z3-x2z3))/(-x3y2z1+x2y3z1+x3y1z2-x1y3z2-x2y1z3+x1y2z3)$ (3)

$c=-(d(x2y1-x3y1-x1y2+x3y2+x1y3-x2y3))/(x3y2z1-x2y3z1-x3y1z2+x1y3z2+x2y1z3-x1y2z3)$ (4)

A second pan angle is chosen such that light projections having this pan angle and varying tilt angles will be well separated in pan angle from those of a) above. The same is done here—the light is pointed at two tilt-separated points and those two points are used in conjunction with the light's X1,Y1,Z1 position centre to calculate the equation of a second plane using equation (1) above, once again setting "d" arbitrarily to 1. The result will be:

$fx+gy+hz+d=0$ (5)

In a manner similar to a) above, f, g, and h may be solved for.

Equations (1) and (5) are solved to get X and Y in terms of Z and scaling variable "d":

$x=-((dg-bd)/(ag-bf))-(((cg-bh)z)/(ag-bf))$ (6)

$y=-((ad-df)/(ag-bf))-(((cf-ah)z)/(bf-ag))$ (7)

Equations (6) and (7) constitute equations of a line (the result of intersection of two planes) in 3-Space. From published 3-Space mathematical theorems, this line will have the form:

$(X-x1)/u=(Y-y1)/v=(Z-z1)/w$ (8)

To find direction numbers for the line, published mathematical theorems tells us the following needs to be calculated:

$u=x2-x1, v=y2-y1, \text{ and } w=z2-z1$ (9)

Two points along this line are needed. The MPD position L=(X1,Y1,Z1) can be "x1" point. To get coordinates of another, simply choose to move farther along the Z axis, arbitrarily setting z2=2*z1 and using (6) and (7) above to generate x2,y2 values. Then this x2,y2,z2 point is used to calculate u,v,w from (9) above. The equation of this line may then be expressed in the form of (8) above.

This line will be tangent to the MPD's plane of pan rotation—what has been referred to as the MPD's "plane of orientation". Using published 3-Space mathematical theorems, it is known that the direction numbers of a 3-Space line: u,v,w are equal to the coefficients of a plane tangent to the line. Thus the equation of the tangent plane to this line is:

$ux+vy+wz+d=0$ (10)

This is the equation of the MPD's plane of orientation. As shall be seen, this equation plus knowledge of the geometric location of the pan and tilt "zero" positions contains enough information to be able to point the MPD at an arbitrary 3D point in space, thus completing the calculation of a useful mathematical representation of 3D orientation.

Calibration

In a preferred embodiment, the movement of the MPD is calibrated such that at an arbitrary 3D point in space can be pointed to. Below, it is assumed that the MPD is pointed using two stepper motors capable of being incremented/decremented in standard "ticks" of angular movement. Each of these controls provides rotational movement along one of two orthogonal axes of motion, which are identified as "Pan" and "Tilt". Together, these two motors control the pointing direction of the MPD. However, this is exemplary only. It is understood that other sorts of directional control may be employed by different manufacturers of MPDs and that one skilled in the art could derive equivalent calibrations for them, once the basic principles are understood. The calculations below set out a method for calibrating two orthogonally mounted motors such as the stepper motors used to control robotic lighting equipment commonly found in the entertainment lighting business. Such calibrations are preferably specific to each individual MPD rather than general calibrations for particular makes or models of MPD as generic classes. Thus such a calibration can be redone as needed over time to adapt to changing individual MPD circumstances such as moving parts wear or projection alignment issues that may arise over time as well as for new, event-specific, mounting geometries.

According to the system and method, the MPD motion control system is calibrated such that it can point the MPD at an arbitrary 3-Space point within range of its field of motion. In order to point at an arbitrary 3-Space point, the pan and tilt pointing angles must be calculated. To do this, there is first selected an arbitrary pan stepper motor tick value (and thus pan position) as the "zero pan" angle and this is measured relative to this point. The corresponding "zero tilt" angle will be the angle at which the MPD light beam points parallel to its plane of orientation. For each of the pan axis and tilt axis rotation motors, there is typically a linear relationship between pan/tilt angle (in degrees or radians) and pan/tilt stepper motor ticks. Thus the following equations hold:

$$\text{PanStepperTicks}=(Kp)(\text{Pan angle Beta})+(\text{Pan zero angle tick position}) \quad (11)$$

$$\text{TiltStepperTicks}=(Kt)(\text{TiltAngleRho})+(\text{Tilt zero angle tick position}) \quad (12)$$

Calibration of other, non-linear, relationships should be evident to one skilled in the art once the basic principles of the calibration configuration are understood in relation to the gestalt of the presently described system and method.

Figure 9:
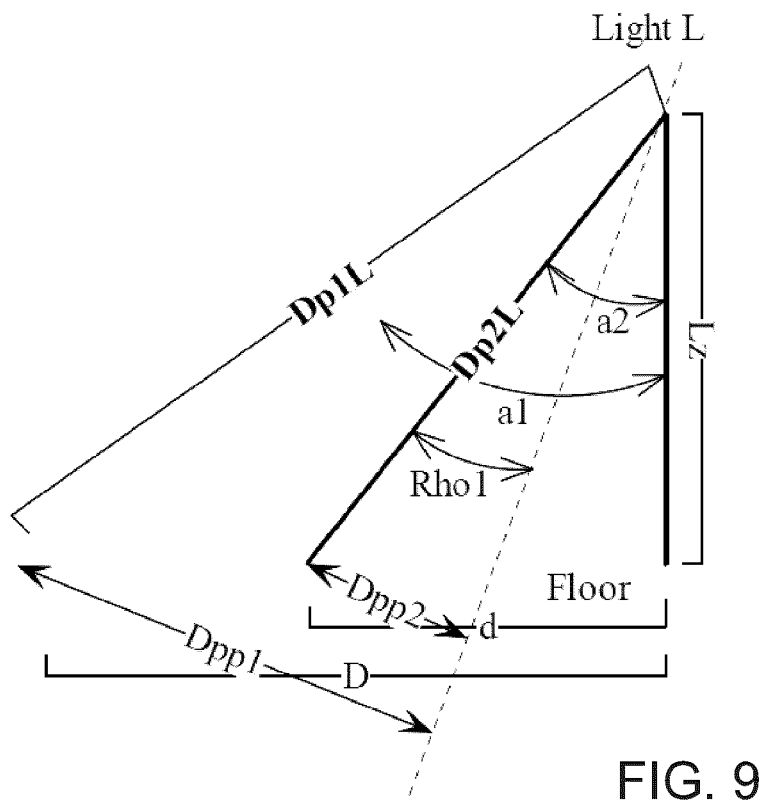
FIG. 9 is a diagram depicting a geometric relationship used in a sample calculation of a tilt calibration constant.

To calculate Kt, measurements at two separate tilt positions can be taken, keeping the pan angle constant so as to have all measurements coplanar. Geometric relationships for such are shown in FIG. 9. Having measured "d" and "D" for the two positions along with the tilt ticks involved in making angles "a1" and "a2", the following equations are derived:

$$a1=\arctan(D/ZL); a2=\arctan(d/ZL) \quad (13)$$

$$Kt(a1-a2)=(\text{tilt ticks 1})-(\text{tilt ticks 2})$$

$$Kt=((\text{tilt ticks 1})-(\text{tilt ticks 2}))/(a1-a2) \quad (14)$$

and it is known that $$L=(XL,YL,ZL); P1=(X1,Y1,Z1)$$

$$P2=(X2,Y2,Z2)$$

The directed distance from a plane to a 3-Space point is then calculated. From published 3-Space mathematical theorems, it is known that the directed distance from a plane having equation $ax+by+cz+d=0$ to a point $(x1,y1,z1)$ is given by:

$$Dpp=(ax1+by1+cz1+d)/((e)(\sqrt{a^2+b^2+c^2})) \quad (15)$$

where "e" is either +1 or −1 so that the first of the numbers ec, eb, or ea which is not zero shall be positive.

This can then be used to calculate the "Tilt Zero Tick Position" by writing:

$$Dp1L=\sqrt{((X1-XL)^2+(Y1-YL)^2+(Z1-ZL)^2)}$$

$$Dp2L=\sqrt{((X2-XL)^2+(Y2-YL)^2+(Z2-ZL)^2)}$$

$$Dpp1=ux1+vy1+wz1+d)/((e)(\sqrt{u^2+v^2+w^2}))$$

$$Dpp2=ux2+vy2+wz2+d)/((e)(\sqrt{u^2+v^2+w^2}))$$

$$Rho1=\arcsin(Dpp1/Dp1L)$$

$$Rho2=\arcsin(Dpp2/Dp2L)$$

$$Rho1\text{DeltaTiltAngleTicks}=(Kt)(Rho1)$$

where AbsoluteRho1TiltAngleTicks=Tilt stepper motor ticks as measured when pointing the light at:

$$P1\text{Tilt ZeroTickPosition}=\text{Absolute}Rho1\text{TiltAngleTicks}-Rho1\text{DeltaTiltAngleTicks} \quad (16)$$

Given that the constant has now been calculated, all the information required to convert back and forth between tilt angles and stepper motor ticks using equation (12) above has been found.

A calculated point is then projected from a 3-Space point into a plane. If there is an arbitrary 3-Space point "P1", the coordinates of a point "P1p" may be calculated to projected the point normally into the plane $ax+by+cz+d=0$ (i.e. such that a line drawn between P1 and P1p is tangent to the plane), the following approach may be taken: Given a plane of equation $ax+by+cz+d=0$, it is known from published three-space mathematical theorems that the equation of the normal line to the plane is:

$$(X-x1)/a=(Y-y1)/b=(Z-1)/c \quad (17)$$

Next, $z2=(-ax2-by2-d)/c$ (solving the pan plane equation) can be solved for where $x2=x1$ and $y2=y1$. Thus, point "P1p" is:

$$x2=x1; y2=y1; z2=(-ax2-by2-d)/c; P1p=(x2,y2,z2) \quad (18)$$

To calculate Kp from e) above, a similar set of calculations to those of f) above may be done, except that these points must be evaluated in the plane of orientation of the pan axis, namely the plane calculated in equation (10) above: $ux+vy+wz+d=0$. Two such points from pan position 1 (pointing at $P1=(x1,y1,z1)$) and pan position 2 (pointing at $P2=(x2,y2,z2)$) are considered. These points are P1p and P2p respectively. As seen in i) above, they can be calculated as:

$$P1p=(x1,y1,(-ax1-by1-d)/c); P2p=(x2,y2,(-ax2-by2-d)/c)$$

Figure 10:
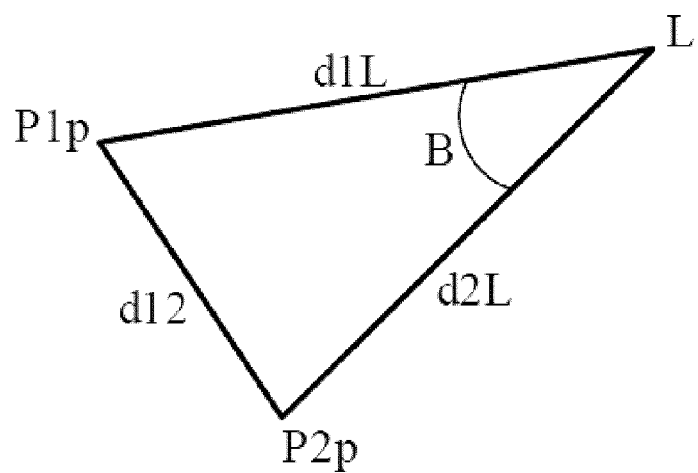
FIG. 10 is a diagram depicting a geometric relationship used in a sample calculation of a pan axis plane projection calculation.

These two points plus the light location $L=(XL,YL,ZL)$ are all co-planar and can thus be analyzed using 2D geometry. It is trivial to calculate distances "d1L", "d2L", and "d12". FIG. 10 depicts the geometric relationships involved. Using the law of cosines, the following is obtained:

$$(d12)^2=(d1L)^2+(d2L)^2-2(d1L)(d2L)\cos(B)$$

Solving for angle "B" yields:

$$B=\arccos[((d12)^2-(d1L)^2-(d2L)^2)/(-2(d1L)(d2L))] \quad (19)$$

B is the pan angle delta between the two positions. In a manner similar to e) above, the following can then be written:

$$Kp(B)=(\text{Pan ticks 1}-\text{Pan ticks 2})$$

$$Kp=(\text{Pan ticks 1}-\text{Pan ticks 2})/B \quad (20)$$

Having solved for Kp and having arbitrarily chosen the "pan zero tick position", full information has been obtained to convert back and forth from angular degrees/radians to/from Pan stepper ticks using equation (11) above.

Controller

Media Projection Devices are typically controlled through a variety of electronic hardware/software/firmware interfaces. A common one, used often in the entertainment lighting business for computer-based lighting control is "DMX-512". However, other electronic interfaces may be used for MPD control and adapted as will be recognized by those skilled in the art. Below are discussed certain preferred aspects of the controller.

The first aspect is the ability to control the un-calibrated movement of the MPD's projections such that the previously mentioned position, orientation, and calibration calculations may be achieved. The second aspect is ability to control a Media Projection Device such that, once calibrated, its media may be directed towards an arbitrary 3D point in space. The third aspect is the ability to selectively replace or modify MPD projection parameter settings in real-time in order to make the projections conform to previously designed constraints regarding location or appearance. Some exemplary possibilities of such replacement or modification are presented below; however other possibilities may also be evident to one skilled in the art once the implications with regard to different types of MPD control (real-time motion and content) are fully appreciated:

- Such modification could involve time-varying direction of projections onto originally foreseen projection surface locations, generating new motion control settings for the MPD based on the difference between its 3D position/orientation and the "designed" 3D position/orientation anticipated when the MPD projection media content was created.
- It could also involve time-varying direction of projections based on the desired 3D projection location, independent of the actual 3D position/orientation of the MPD itself.
- It could also involve modifications related to MPD projection appearance "look" parameters such as projection size (iris, beam width, or "barn-door" settings, etc.), shape (keystone correction, gobo, etc.), brightness, color, etc., or other non-visual characteristics if the MPD projects non-electromagnetic media.
- Such modifications could also be based on time-varying or static maps of the physical 3D space that associate particular projection "looks" such as size, pattern, colour, shape with specific spatial/temporal regions so that as the MPD projections are directed at different 3D or 2D regions, different "looks" are asserted based on where in space and time (relative to various event timing marks) the MPD is directing its media.
- Such modification could also be based on algorithms developed specifically to incorporate a three-dimensional or otherwise, time-varying, computer simulation of the event space occupied by the projections. Such a computer simulation would drive both the MPD projection direction/location and its projection "look" appearance or content settings. In this way, new media effects could be produced using feedback from the computer vision system as input to a time-varying computer simulation of the event space, the output of which was, in turn, used to drive MPDs' projection direction, location, "look", or content settings.

The fourth preferred aspect of the controller is the ability to use feedback from the computer-vision-based photogrammetric measurements to enhance calibration accuracy once an initial calibration has been performed and, ultimately, to be able to function as a real-time precision guidance system ensuring that MPD projections take a very specific real-time 3D trajectory by generating real-time corrective control signals based on real-time analysis of the digital video image stream. These aspects are discussed in more detail below.

Proper Media Projection Device Movement for Position, Orientation, and Calibration Calculations:

In order to maximize accuracy of MPD measurements used in the algorithmic calculations, it is preferred that the following constraints be met: a) that the images acquired have proper separation between projection positions to ensure acceptable mathematical accuracy and b) that it be possible to obtain these images automatically by use of photogrammetric measurements in conjunction with the controller, which are (at the time of the controlling movements required) un-calibrated. Such a lack of calibration requires specific control algorithms and tight feedback between the imaging sub-system and the motion control interface of the MPDs having their positions and orientations calibrated. An exemplary set are provided here, it being understood that variations on these can be developed by one skilled in the art once their relationship to the overall context of the system is understood.

Automatic Pointing of a Media Projection Device to Calibration Point Locations:

FIG. 11 shows six calibration locations 34, within the camera frame field of view, at which ellipses may be captured and processed in order to determine the position and orientation of the MPD 18. Such a process of positioning of the MPD's projection (e.g. media 20); capturing an image of it for use in the calibration calculations; and then moving the MPD 18 to point at a new location, is sequential in time. The calibration movements needed to achieve the projection locations depicted in FIG. 11 are exemplary in that they assume motion control of the projection direction of the MPD in question is via motors which control rotational movement about two orthogonal axes dubbed "pan" and "tilt". The geometry of these axes is assumed to be one wherein rotatable tilt motors are mounted on top of an orthogonal, rotatable, pan platen and are thus also rotated when changes in pan angle occur. It is understood that MPD motion controls other than the aforementioned pan/tilt motors would give rise to other approaches to roughly directly/controlling un-calibrated MPD movements. These would be evident to one skilled in the art of such matters once the basic principles depicted below are appreciated in the overall context of the system and method described herein.

With reference to FIG. 11, to determine the Y" axis, a line can be calculated between Ellipse A's centre point (the initial or "home" position for the calibration) and the centre point of Ellipse B in pixels. The location of Ellipse B is reached by tilting the light in the angular direction that causes an increase of Ellipse B's major axis length, such measurements also being made in pixels. The X" axis is found to be a convenient, arbitrarily chosen line orthogonal to the Y" axis line.

Locations C and D in pixels can be found by calculating the midpoints between Ellipse A and where the X" axis intercepts the camera frame edges. Location F can be calculated by moving upwards (in the camera frame) along a line co-linear to the major axis of Ellipse A until Ellipses A and F are separated by a minimum distance of ½ the major axis length of A (all distances in pixels), such a distance being a convenient metric that has been found to ensure reasonable numeric accuracy in calculations.

The equations below estimate the change in pan and tilt motor "ticks" (motor angular increment units with an as yet un-calibrated relationship to angular degree/radian units) given the change in pixels along the X" and Y" axes from the home position. These equations are to be used to calculate the pan and tilt ticks needed to reach locations C, D, and F:

$$\Delta \text{Pan Pixels} = \Delta \text{Pan Ticks/PtpPix}$$

$$\Delta \text{Tilt Pixels} = \Delta \text{Tilt Ticks/TtpPix} + \Delta \text{Pan Ticks/PTtPix}$$

Pan Ticks Per Pixel ("PtpPix"), Tilt Ticks Per Pixel ("TtpPix"), and Pan-Tilt Ticks Per Pixel ("PttPix") may be calculated by tilting and panning the spotlight a sufficient distance to determine these ratios. PTtPix is calculated by observing the change in the ellipse position along the Y" axis when only a panning movement is performed. These ratios thus establish a very crude calibration between angular motor movement "ticks" and image pixels, allowing the MPD to be roughly directed via its pan/tilt motor settings to position the location of its projection in the camera image with some degree of predictability.

Location E is reached by tilting the spotlight (starting from location D) in the direction that causes an increase of ellipse major axis length.

MPD Arbitrary 3-Space Pointing Control:

The mathematical calculations below set out an exemplary case of how this may be achieved, building upon the 3D calibration calculations previously described in this document. It is understood that variations on the basic approach depicted here will be evident to one skilled in the art once the element of arbitrary 3-Space pointing control is understood. In particular, different forms of MPD motion control from the pan/tilt system mentioned previously will be seen to be simply slightly different cases requiring slightly different mathematics.

An exemplary case of calculating parameter values necessary to point an MPD at a 3-Space point of interest is discussed below, in which, using the calculated plane of orientation plus the calibrated Media Projection Device pan/tilt movement, the MPD is directed at an arbitrary 3D point.

This is done by calculate the equation of the line formed by the MPD's (XL,YL,ZL) location and the arbitrarily chosen "pan zero tick position". In order to reference pan angles relative to the zero pan position, it is necessary to reference a line drawn from the MPD radially outward in the MPD's plane of orientation (i.e. in the plane of pan rotation). This will simply serve as a reference angle from which to calculate pan angle measurements. To do this, a point is chosen where the MPD light beam's projection is visible to the camera and the MPD is thus panned/tilted/directed at a known point P2=(x2, y2,z2). To calculate this "pan zero line", P2 pan rotation plane ux+vy+wz+d=0 is projected using equation (18) to obtain:

$$P2p=(X2p,Y2p,Z2p)=(X2,Y2,(-ax2-by2-d)/c).$$

For standardization, a 3-Space line equation may be used between these two points to represent the pan zero line. Setting P1=L=(XL,YL,ZL)=(x1,y1,z1) in conjunction with P2p, the following pan zero line equation is obtained:

$$\text{PanZeroLine:}\ (X-XL)/(X2p-XL)=(Y-YL)/(Y2p-YL)= (Z-ZL)/(Z2p-ZL) \quad (21)$$

The next step in this example is to calculate the pan stepper tick setting needed to pan the calibrated MPD to point at an arbitrary point: Pa=(Xa,Ya,Za). To do this, first Pa is projected into the pan rotation plane using equation (18) applied to the light plane of rotation ux+vy+wz+d=0, obtaining:

$$Pap=(Xap,Yap,Zap)=(Xa,Ya,(-aXa-bYa-d)/c)$$

The equation of the line between the MPD at (XL,YL,ZL) and Pap is then calculated to obtain:

$$\text{PanPointingLine:}\ (X-XL)/(Xap-XL)=(Y-YL)/(Yap-YL)=(Z-ZL)/(Zap-ZL) \quad (22)$$

Using published 3-Space mathematical theorems, the pan angle "Beta" is calculated between the pan zero line and the pan pointing line using the direction numbers of each line. The angle between two lines with direction numbers for line 1 of (u1,v1,w1) and for line 2 of (u2,v2,w2) is given by:

$$\text{Beta=arc Cos}\ [(u1u2+v1v2+w1w2)/((e1)(e1)*\text{Sqrt} ((u1^2+v1^2+w1^2)(u2^2+v2^2+w2^2)))] \quad (23)$$

where e1 is +1 or −1 so that the first of the numbers e1w1, e1v1, and e1u1 which is not zero shall be positive and similarly for e2. Setting u1=X2p−XL, v1=Y2p−YL, w1=Z2p−Z1 and setting u2=Xap−X1, v2=Yap−YL, w2=Zap−ZL, the pan angle Beta can be calculated as the desired pan pointing angle. Care must be taken to ensure this calculation works in all trigonometric quadrants relative to the pan zero line.

The number of stepper ticks such a rotation would be is then calculated as: PanTicks=(Kp)(Beta). Adding the pan zero offset will give the desired answer from equation (11), namely the total pan stepper ticks setting of:

$$\text{PanPointingTicks}=(Kp)(\text{Beta})+\text{PanZeroAngleTicks} \quad (24)$$

The next step is to calculate the tilt stepper tick setting needed to tilt the calibrated MPD to point at an arbitrary point Pa=(Xa,Ya,Za). To do this, the tilt angle between the MPD's plane of orientation and Pa is calculated. This is achieved using equation (15) in conjunction with the orientation plane equation: ux+vy+wz+d=0 to calculate:

$$Dpap=(uXa+vYa+wZa+d)/((e)(\text{sqrt}(u^2+v^2+w^2))$$

The distance DaL between the MPD at (XL,YL,ZL) and Pa can also be calculated as:

$$DaL=\text{Sqrt}((Xa-XL)^2+(Ya-YL)^2+(Za-ZL)^2)$$

The tilt angle Rho needed is thus:

$$\text{TiltPointingAngle}=Rho=\text{arc Sin}(Dpap/DaL) \quad (25)$$

From equation (12) the tilt pointing ticks setting is thus:

$$\text{TiltPointingTicks}=(Kt)(Rho)+\text{TiltZeroAngleTicks} \quad (26)$$

MPD Parameter Replacement or Modification

Replacement or modification of MPD parameters is dependent on the specific hardware/firmware protocols employed to transmit control parameters from a computing platform to one or more MPDs. Exemplary of such a protocol is "DMX-512", a common lighting control standard used in the entertainment industry. The following discussion pertains to a DMX-based MPD control interface. However, it will be readily appreciated that, once the basic elements of such modification/replacement are understood, one skilled in the art could easily develop alternative implementations for other hardware-specific protocols.

DMX-512 is a serial data protocol in which "frames" of data are sent at a rate of approximately 250 kbps. The frames are organized into 512 "channels" of eight bit control values. Thus devices being controlled using DMX get updated approximately 44 times per second when the full 512 channels of data are transmitted. One method of selectively replacing MPD control values is to interpose a memory mapped micro-controller within the DMX data stream. Such a device would have one or more separate DMX input(s) and DMX output(s), and would use the micro-controller's hardware and firmware to relay the data, frame by frame, through its memory. A second block of "shadow" memory, mapped one to one to the DMX data buffer's data channel values could contain values that were meant to supplant any incoming ones. A further "translation table" could indicate to the micro-controller whether incoming DMX channel values were to be sent on to the output, replaced, or "translated" (replaced by a new value having some algorithm relationship between the incoming value and shadow memory values—addition of the shadow memory value to the incoming value being one simple example of such) in one of a variety of ways based on data from their shadow memory counterparts. Under such an arrangement, the values written to the DMX output port may be dynamically taken either from their incoming data table, from the shadow channel memory, or from an algorithmic combination of incoming and shadow data on a channel-by-channel basis depending on translation table decision values. Such an arrangement—under the control of the system's computing platform—would allow for real-time, channel-specific, replacement of selected channels of data while continuing to pass through all other DMX data being transmitted from MPD control software (such as a lighting control console or other MPD-specific control device) separate from the present system and method.

Enhanced Calibration Accuracy

Another preferred aspect of the present method and system is the ability to enhance initial calibration to compensate for non-linear, real-world, effects that cause discrepancies between the idealized mathematical depiction of the MPDs and their movements and the reality of the world. Effects such as mis-alignment of MPD directivity (so that the "throw" of the projected media lies along a different path to the one mathematically expected by the present method and system), friction and wear of bearings and mechanical couplings, etc. can all contribute to the reality that, when fully calibrated, the position of an MPD project may be different from where it is mathematically expected to be by the calibration algorithm calculations.

Such an error can be sensed and iteratively measured using the photogrammetric measurement principles discussed above. A variety of methods for iterative minimization of error are possible and many possibilities will be evident to one skilled in the art once the concept of using computer-vision-based feedback to augment an initial calibration of an MPD is appreciated. The difficulty of this problem is one of a multitude of mathematical dimensions—there are many variables in the calibration calculations that, if changed even slightly, will result in very different calibration settings. The general problem of large dimensional searches has been mathematically explored by a number of approaches. One possible method is that of genetic algorithm search. In such an approach, a set of test locations are chosen and, using the results of the initial calibration, each MPD is directed in turn to point at each location. The "error function" for use in the genetic algorithm is the difference between the position "predicted" by the mathematics of the initial calibration and the actual position, such a difference being expressed as an absolute value. Having measured the entire set of locations in this manner, random variations to the mathematical parameters giving rise to the predicted location are introduced to see if there are any sets of such slightly different parametric values that will optimize the overall error function (i.e. minimize the error). Such a method is exemplary of one way of "tuning" calibration parameters to at least partially compensate for real world, non-ideal, parts and mechanisms.

A second approach may be to use the computer-vision-based feedback to position the MPD projection exactly in real-time. While very possible for static projections that are held stably in one spot for reasonable amounts of time such as several seconds or more, use of such feedback for continuously moving MPD projections risks over-compensating for the transmission and mechanical lag times inherent in the MPD motion control electronics and hardware itself. A solution for this is to create a control algorithm built as a digital, sampling-based, control algorithm with knowledge of the motion control parameters of each MPD integrated as "learned behaviour" based on MPD test movements performed during the calibration process. Once learned, knowledge of such motion control delays could be deftly integrated into the calibration system, resulting in a directing system that anticipates movement lags as much as possible, utilizing mathematical techniques such as real-time Kalman filtering, particle filter methods, etc. to obtain optimal results.

Examples

There will now be discussed two examples that are implemented on a computing platform capable of floating point (preferred) or fixed point (possible) arithmetic. It will be understood that the components and principles of operation discussed below is not intended to be limiting. Rather, the examples are intended to provide guidance on design principles to achieve adequate results, with the understanding that the actual design may vary depending on the constraints of any particular situation, the available resources, and the preferences of the user.

A preferred platform will have enough computing horsepower to process real-time video image data at rates of at least 7.5 frames per second. Exemplary of such a platform would be a 3.0 GHz, PC or Mac computer equipped with 512 MB of memory or more. However other hardware platforms are certainly possible.

Figure 12:
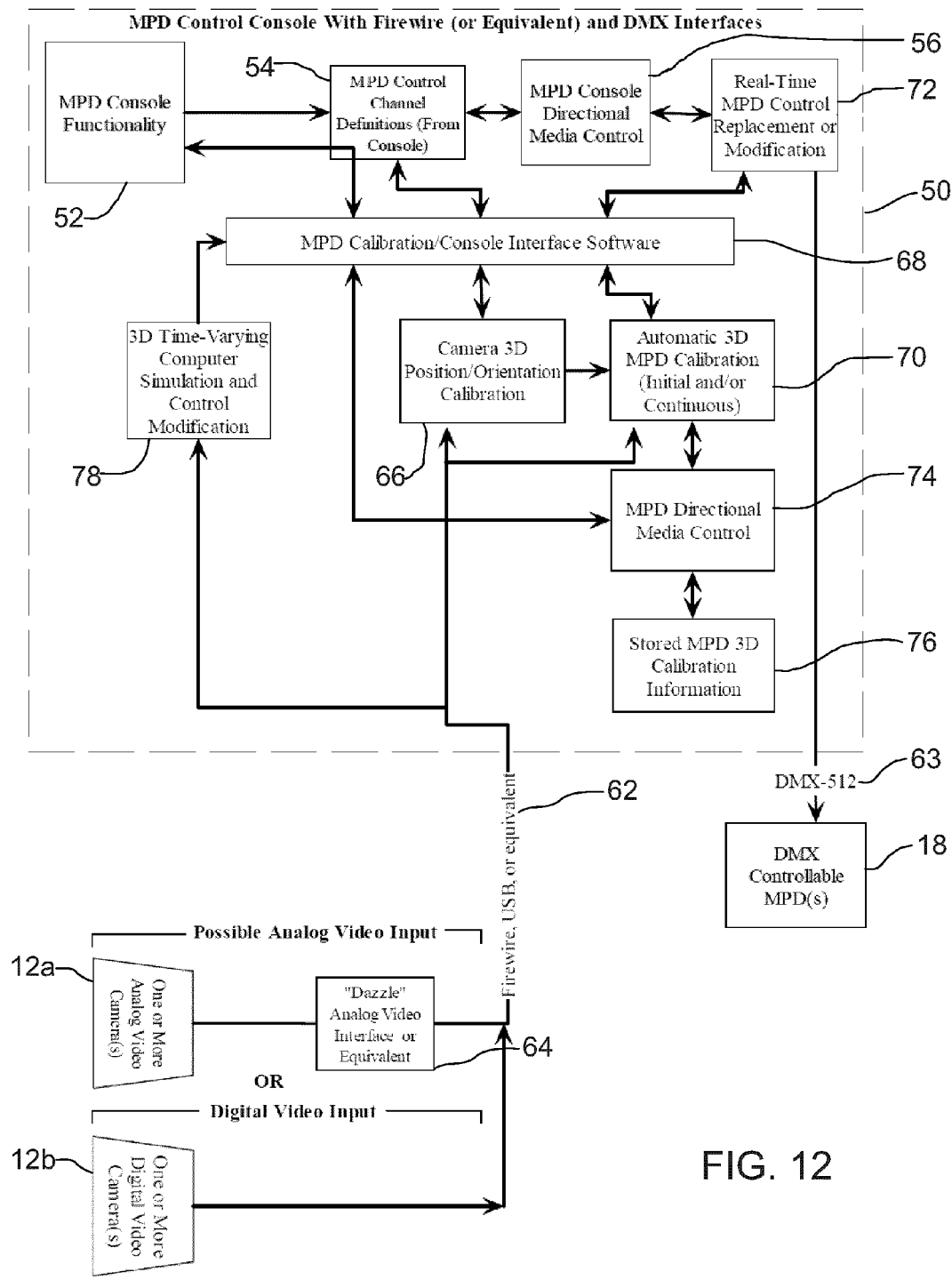
FIG. 12 is a block diagram of an example of a system for projecting media.

Referring to FIG. 12, in the first example, the system is embedded within an existing commercial MPD control console 50. This is referred to as the "Internal Embodiment", and includes a MPD Console Functionality module 52, a MPD Control Channel Definitions module 54, and an MPD Console Directional Media Control module 56. Such an MPD control console 50 is built on a computing platform capable of receiving digital video image data via some common hardware interface standard such as Firewire, USB 2.0, Gigabit Ethernet, etc. Exemplary of such control consoles are certain models of lighting console, which are generally used to control and position robotic lights that respond to the "DMX-512" control protocol 63—a serial data protocol common in the entertainment lighting industry. The discussion of this example and its block diagram shown in FIG. 12 assume such a console platform, modified appropriately. However, it is entirely possible to equip other control consoles such as those for video projection or camera control and movement with an Internal Embodiment, such equipping being straightforward to one skilled in the art once the general nature of integration between the present system and the existing console is appreciated.

In FIG. 12, one or more video imaging cameras 12a or 12b acquire image data fed into the MPD Control Console 50 via Firewire or some other appropriate digital video data transfer interface 62. The nature of the cameras can be either purely digital (12b) or possibly analog (12a), followed by appropriate digitization and encoding interface hardware 64 (e.g. "Dazzle" Analog Video Interface or equivalent) capable of rendering the analog video signal into appropriate digital form.

Once inside, this image information feeds a variety of software objects, depicted in FIG. 12 in modular, block diagram, form. One such block is the "Camera 3D Position/Orientation Calibration" module 66. It is responsible for 3D position/orientation calibration of the camera(s) using a calibration object (as discussed earlier in this document) and effected through the "MPD Control Console Interface Software" module 68 to allow for interaction with a human console operator during setup. Another such module entitled "Automatic 3D MPD Calibration (Initial and/or Continuous)" 70 provides for automatic 3D position/orientation calibration of one or more MPD(s) connected to the control outputs of the MPD Control Console—also as discussed in earlier sections of this document. It, too, interacts with the console operator as appropriate through the MPD Control Console Interface Software module 68. It also interacts with the "Real-Time MPD Control Replacement or Modification" module 72 to selectively take control of needed MPD control channels to direct the functioning of the MPD(s). Provision of "3D position/orientation calibration" in module 70 also includes any "real-time" accuracy enhancement that may be done via real-time computer-vision analysis—this is the reason for the bracketed part of the module's name. This module also relies on the "MPD Directional Media Control" module 74 to generate control information to direct the MPD(s) projections appropriately, both before calibration has been achieved and after, when pointing one or more MPD(s) at an arbitrary 3D spatial location is desired. To aid in effecting this post-calibration direction control, calibration information is all stored in the "Stored MPD 3D Calibration Information" module 76, where it can be retrieved at any time.

The incoming video stream also feeds the "3D Time-Varying Computer Simulation and Control Modification" module 78. This module is capable of running a real-time computer simulation of the stage environment, complete with knowledge of where the MPD(s) are pointing at any given moment, the nature of the location and appearance of their projection(s), and the originally planned location and appearance conceived with the media event was created/designed. Equipped with such knowledge, this module can issue commands to the MPD(s) after they have been calibrated to ensure that the look and location of MPD projections devolves as it should in real-time, independent of the geometric mounting position/orientation of the MPDs themselves. Such a module is not used during calibration, but rather during the show or event for which the MPD(s) were put in place. It is used to realize the original design/creation media projection vision independent of MPD mounting geometry and may therefore be an important, useful, aspect of the system.

Figure 13:
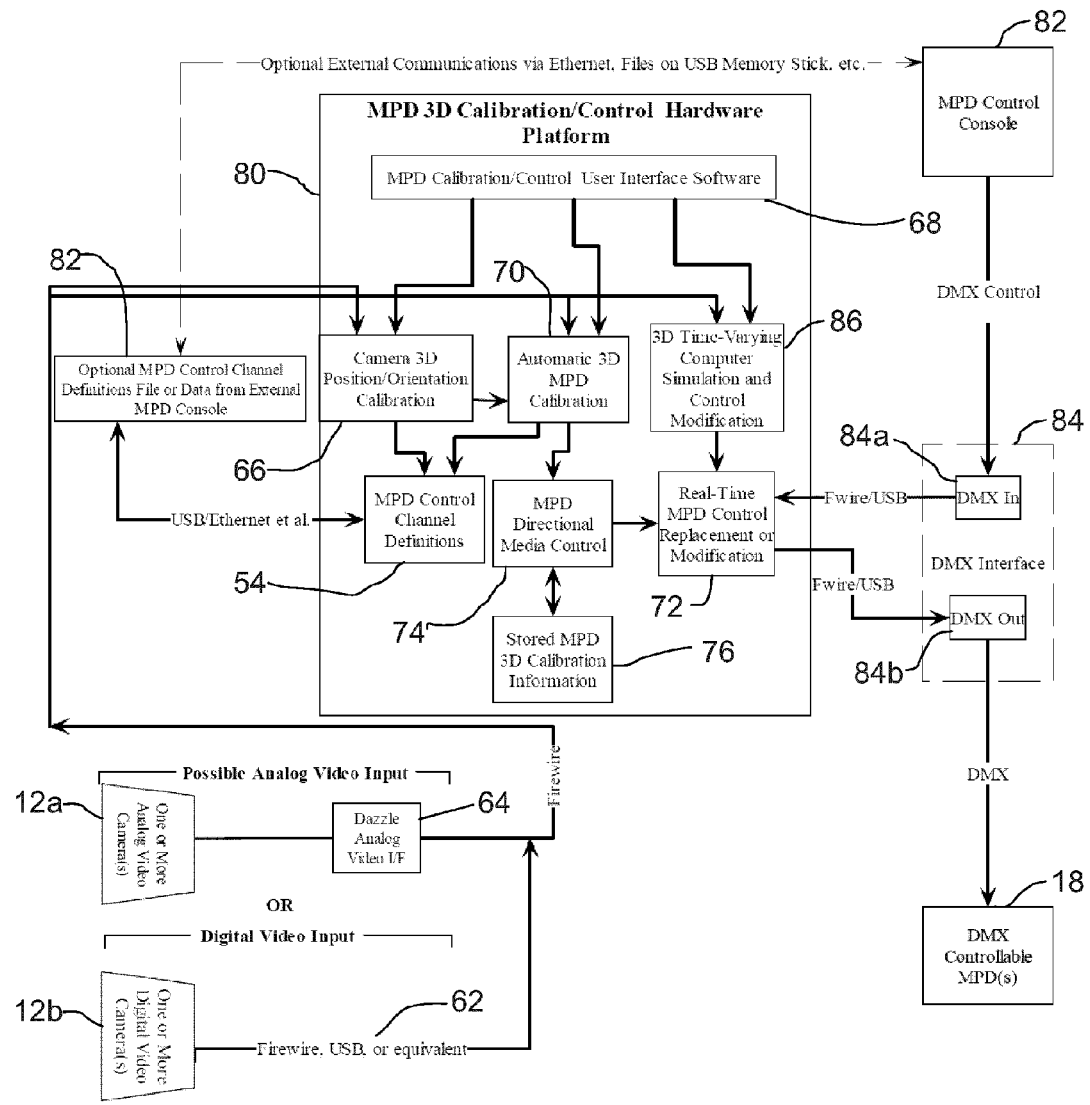
FIG. 13 is a block diagram of an alternative example of a system for projecting media.

The second preferred embodiment is referred to as the "External Embodiment". FIG. 13 depicts a block diagram of this embodiment. In it, a separate "MPD 3D Calibration/Control Hardware Platform" block 80 contains most of the system, which is interfaced to take input from cameras 12*a* and 12*b* as in the Internal Embodiment and to share MPD control with a normal MPD Control Console 82 via a DMX hardware interface 84 equipped with separate "DMX In" and "DMX Out" data ports 84*a* and 84*b*. Such DMX interfaces are commercially available, an exemplary manufacturer of such being the company "EnTec".

Functionality in this embodiment is much the same as in the Internal Embodiment discussed previously. Since the External Embodiment runs on a physically separate hardware platform from the MPD Control Console 82, its user interface module "MPD Calibration/Control User Interface Software" 68 will be more extensive, containing all the user interface support such as windowing and mouse drag/drop/click events normally found in a modern end-user software application along with input modalities for specifying what, if any, time-varying simulation modeling is done by the "3D Time-Varying Computer Simulation and Control Modification" module 86. Additionally, there is provision for some form of communication from the external MPD Control Console 82. This is contained in the "Optional MPD Control Channel Definitions File or Data from External MPD Console" block 88. Such provision could be simply realized via a file of MPD definition/configuration data that was copied to the MPD 3D Calibration Hardware Platform 80 using a "Flash Memory Stick" or other file transfer medium, an Ethernet network connection, or some other convenient form of computer-to-computer data interchange. Such communication could be unidirectional—from the MPD Control Console to the MPD 3D Calibration Hardware Platform—or possibly bi-directional, with data being passed back and forth between the two platforms. In the latter case, the overall integration of the two platforms might be significant (effectively the same as the Internal Embodiment but with a slightly different hardware layer that split functionality across two physically distinct computing platforms). Regardless, communication between these two platforms could contain MPD control channel specifications, definitions, or other useful information as appropriate. If this inter-platform communications capacity was not utilized, such information as was necessary for functioning of the MPD 3D Calibration Hardware Platform could be input in two other ways: Firstly, the operator could enter such data by hand via the "MPD Calibration/Control User Interface" module 68. Secondly, the "Real-Time MPD Control Replacement or Modification" module 72 could be used to monitor DMX control signals from the MPD Control Console 80 and log relevant information to create its own internal representation of MPD channel assignments. For example, the MPD Control Console 82 could be used to change the pan/tilt pointing direction of a particular MPD without changing any other values. Subsequent to this action, the log file would reveal which were the DMX control channels for that particular MPD's pan/tilt control and that information could be stored in the "Stored MPD 3D Calibration Information" module 76 for later use.

Functionality of the other modules/blocks of the MPD 3D Calibration Hardware Platform may be the same as in the Internal Embodiment; the same type of digital video camera input may be provided as well. The "DMX Interface" block 84 would enable a frame-by-frame or channel-by-channel (depending on hardware design) buffer that would allow selective replacement or modification of MPD control data (as discussed in detail previously in this document), effectively conferring the MPD 3D Calibration Hardware Platform 80 with the power of being able to modify the MPD Control Console's control data stream at will.

Virtual Simulation

As mentioned above, the system may be employed for situations that involve more than mere media projection. The system may also be used to display a virtual simulation, such as a simulation that responds to external events. A virtual simulation may be considered a program running on a processor, such as the processor describe above or another associated processor, that varies according to scheduled and unscheduled events.

Implementing a virtual simulation may be based on a system such as those described above. In addition to those components described above, there may be other components. For example, rather than sensing only through the electromagnetic detector, there may be other sensors that detect movement, vibration, temperature, etc. that would provide feedback to the processor. In addition or alternatively, the electromagnetic detector may part of a sub-system that detects particular characteristics of the system or objects in the system, such as object recognition, size, calculation of speed, etc. Once implemented, the instructions for the media controller are obtained from the virtual simulation to cause the media projectors to move and project the appropriate media, as described above.

The virtual simulation may comprise a spatial or temporal map of the field of view, and respond differently to events differently depending on where and when they occur. The virtual simulation may also receive inputs from external data or sensors, such as the weather, the time of year, special events, etc. The virtual simulation may react differently to the size of an individual, the presence of an object, etc. By using the photogrammetric calculations and the proper calibrations for the media projectors, displays of media can be accurately projected according to the virtual simulation.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. The scope of the claims should not be limited by the preferred embodiments set forth in the examples, but should be given the broadest interpretation consistent with the description as a whole.

What is claimed is:

1. A method of controlling media projectors, the method comprising the steps of:
    providing at least one electromagnetic detector having a field of view directed toward a three dimensional space;
    photogrammetrically characterizing at least a portion of the field of view;
    providing at least one media projector that projects at least an electromagnetic signal;
    providing a projection controller that moves one or more media projectors in at least two dimensions;
    obtaining at least three measurement locations within the at least a portion of the field of view by moving the media projector in at least two dimensions;
    using the at least one electromagnetic detector to detect the measurement locations within the three dimensional space using the electromagnetic detector to obtain photogrammetric data; and
    calibrating the projection controller based on the photogrammetric data to project the media toward an arbitrary point in the three dimensional space.

2. The method according to claim 1, further comprising the step of using video imaging devices as the electromagnetic detectors.

3. The method according to claim 1, further comprising the step of using at least a visual light projector as the media projector.

4. The method according to claim 1, further comprising the step of using at least a non-electromagnetic projector as the media projector.

5. The method according to claim 4, further comprising the step of using a removable electromagnetic projector as the media projector.

6. The method according to claim 1, further comprising the step of using one or more pairs of electromagnetic detectors, with each pair obtaining a stereoscopic image of the at least a portion of the field of view.

7. The method according to claim 1, further comprising the step of using a plurality of electromagnetic detectors having overlapping fields of view within the three dimensional space, and further comprising the step of photogrammetrically characterizing the overlapping fields of view.

8. The method according to claim 1, further comprising the step of repositioning at least one media projector to a new position, and recalibrating the projection controller to account for the new position.

9. The method according to claim 1, further comprising the steps of:
    using a computer interface to specify a selected location or selected path within the three dimensional space; and
    causing the calibrated projection controller to point at least one media projector at the selected location or along the selected path.

10. The method according to claim 1, further comprising the step of using the projection controller to control the media parameters of the media projector.

11. The method according to claim 1, further comprising the step of defining, within the projection controller, at least one of a spatial media map and a time media map of the at least a portion of the field of view, the projection controller controlling the media parameters of the media projector based on the spatial media map and the time media map.

12. The method according to claim 1, further comprising the step of programming the projection controller with a virtual simulation, the projection controller causing the at least one media projector to project the virtual simulation in the three dimensional space.

13. The method according to claim 1, further comprising the step of using at least one of the electromagnetic detector and one or more sensors to detect an event in the three dimensional space.

14. The method according to claim 13, further comprising the step of using movement of an object or a state of an object as the event.

15. The method according to claim 13, further comprising the step of modifying the virtual simulation in response to the event.

16. The method according to claim 1, further comprising the step of using calibrating each projection controller for each media projector.

17. A system for projecting media, the system comprising:
    at least one electromagnetic detector having a field of view directed toward a three dimensional space;
    at least one media projector that projects at least an electromagnetic signal; and
    a projection controller comprising a motorized controller that moves one or more media projectors in at least two dimensions, and the projection controller further comprising a processor that is programmed to:
        photogrammetrically characterize at least a portion of the field of view;
        move the at least one media projector in at least two dimensions to obtain at least three measurement locations within the at least a portion of the field of view;
        detect the measurement locations within the three dimensional space using the at least one electromagnetic detector to obtain photogrammetric data; and
        calibrate the motorized controller based on the photogrammetric data to project the media toward an arbitrary point in the three dimensional space.

18. The system according to claim 17, wherein the at least one electromagnetic detector comprises at least one video imaging device.

19. The system according to claim 17, wherein each media projector comprises at least a visual light projector.

20. The system according to claim 17, wherein the media projector comprises at least a non-electromagnetic projector.

21. The system according to claim 20, wherein the media projector further comprises a removable electromagnetic projector.

22. The system according to claim 17, further comprising one or more pairs of electromagnetic detectors, and each pair is arranged to obtain a stereoscopic image of the at least a portion of the field of view.

23. The system according to claim 17, further comprising a plurality of electromagnetic detectors which have overlapping fields of view within the three dimensional space, and further comprising a mechanism for of photogrammetrically characterizing the overlapping fields of view.

24. The system according to claim 17, wherein the processor is further programmed to recalibrate the projection controller to account for a new media projector position.

25. The system according to claim 17, wherein the processor is further programmed to instruct the motorized controller to point at least one media projector at a selected location or along a selected path.

26. The system according to claim 17, wherein the processor controls the media parameters of the media projector.

27. The system according to claim 17, wherein the processor is programmed with at least one of a spatial media map and a time media map of the at least a portion of the field of view, and the processor controls the media parameters of the media projector based on the spatial media map and the time media map.

28. The system according to claim 17, wherein the processor is programmed with a virtual simulation, and the processor is further programmed to cause the at least one media projector to project the virtual simulation in the three dimensional space.

29. The system according to claim 17, wherein the processor is further programmed to detect an event in the three dimensional space using at least one of the electromagnetic detector and one or more sensors.

30. The system according to claim 29, wherein the event comprises movement of an object or a state of an object.

31. The system according to claim 28, wherein the processor is further programmed to modify the virtual simulation in response to the event.

* * * * *